United States Patent [19]
Eng

[11] Patent Number: 5,963,557
[45] Date of Patent: Oct. 5, 1999

[54] HIGH CAPACITY RESERVATION MULTIPLE ACCESS NETWORK WITH MULTIPLE SHARED UNIDIRECTIONAL PATHS

[76] Inventor: John W. Eng, 17 Skylar Dr., Southborough, Mass. 01772

[21] Appl. No.: 08/843,033

[22] Filed: Apr. 11, 1997

[51] Int. Cl.[6] ........................................... H04J 3/02
[52] U.S. Cl. ..................... 370/432; 370/276; 370/312; 370/443; 370/478; 455/5.1
[58] Field of Search ..................... 370/276, 312, 370/352, 412, 443, 445, 448, 462, 468, 478, 221, 432, 437, 447, 458; 455/4.2, 5.1

[56] References Cited

U.S. PATENT DOCUMENTS

| | | | |
|---|---|---|---|
| 4,774,707 | 9/1988 | Raychaudhuri | 370/447 |
| 5,425,027 | 6/1995 | Baran | 370/432 |
| 5,586,121 | 12/1996 | Moura et al. | 370/312 |
| 5,644,576 | 7/1997 | Bauchot et al. | 370/437 |
| 5,648,958 | 7/1997 | Counterman | 370/462 |
| 5,684,799 | 11/1997 | Bigham et al. | 370/352 |
| 5,684,802 | 11/1997 | Perreault et al. | 370/448 |
| 5,689,646 | 11/1997 | Thorson | 370/221 |
| 5,696,765 | 12/1997 | Safadi | 370/478 |

*Primary Examiner*—Douglas W. Olms
*Assistant Examiner*—Shick Hom
*Attorney, Agent, or Firm*—Proskauer Rose LLP

[57] ABSTRACT

A method and system are disclosed for enabling point-to-point and multicast communication in a network using three types of communication channels, namely, one or more upstream payload channels, one or more upstream control channels and one or more downstream channels. At least the upstream control and upstream payload channels can carry bitstreams simultaneously; a bitstream may be simultaneously carried on the upstream control and upstream payload channels of a shared medium during overlapping periods of time. Each channel illustratively is divided into slots or mini-slots. Each upstream payload channel is assigned for carrying upstream directed payload bitstreams from stations to a central controller. Each upstream control channel is assigned for carrying upstream directed control bitstreams, such as reservation request bitstreams requesting reservation of time slots of the upstream payload channel, from the stations to the central controller. At least one downstream channel is assigned for carrying at least downstream directed control bitstreams, such as bitstreams containing acknowledgments, collision, status of reservation request, and also containing indications of assigned slots in the upstream payload channel, from the central controller to the stations. The downstream channel may also illustratively carry payload bitstreams.

32 Claims, 11 Drawing Sheets

HIGH CAPACITY RESERVATION MULTIPLE ACCESS NETWORK WITH MULTIPLE SHARED UNIDIRECTIONAL PATHS

FIELD OF THE INVENTION

The present invention relates to communication networks, such as hybrid fiber coaxial (HFC) cable networks, wireless communication networks, satellite networks, etc., in which multiple subscriber stations transmit messages on one or more unidirectional multiple access communication channels. In particular, the present invention relates to enabling each subscriber station to reserve a portion of one or more multiple access unidirectional communication channels for contention free access. This enables the cable network to be used for point-to-point and multicast communication in addition to conventional broadcast TV.

BACKGROUND OF THE INVENTION

It is desirable to provide ubiquitous, integrated high speed and high capacity digital communication services (such as video, data and voice) to homes, schools, governments, and businesses. One such network, the telephone network, could be upgraded to provide such services. However, the century-old copper telephone network, primarily designed for telephony, has a usable bandwidth of only about 1 MHz. Therefore, it is quite difficult and expensive to provide multi-channel digital video, along with data and voice on the telephone network. On the other hand, the coaxial drop line of a cable network to each home has a high usable bandwidth of about 1 GHz, providing ample speed and capacity to the integrated broadband services listed above, in addition to delivering traditional broadcast analog video programs. These traditional coaxial cable networks can be readily upgraded to bidirectional hybrid fiber-coaxial cable networks (HFC networks) to enable bidirectional high speed and high capacity communications. The HFC network is inherently a shared medium technology. Nevertheless, providing efficient, high speed, high capacity shared access to the upstream transmission has been a challenge to the communication industries.

FIG. 1 shows a conventional bidirectional hybrid fiber coaxial (HFC) cable network 10 having a head end 12. The head end 12 has a head end controller 28 that can communicate with one or more other networks 30, such as the internet and local area networks. Downstream directed signals are transmitted from, and upstream directed signals are received at, the head end controller 28 via a coaxial link 34 connected to a diplexer 32. The diplexer 32 splits the downstream directed signals from the other signal carried on the link 34 and outputs them to a laser transmitter 36. The laser transmitter 36 modulates the downstream directed signals onto an optical signal that is transmitted via a downstream optical fiber trunk 14. Likewise, upstream directed signals modulated on a signal carried via an upstream optical fiber trunk 14' may be demodulated at an optical receiver 38. The diplexer 32 combines such upstream directed signals with the other signals carried on the link 34 for receipt at the head end controller 28.

The upstream and downstream optical trunks 14, 14' connect the head end 12 to an optical node 16. The head end 12 and optical node 16 may be separated by up to about 80 kilometers. Like the head end 12, the optical node 16 has a laser transmitter 40, an optical receiver 42 and a diplexer 44. The laser transmitter 40 is for modulating upstream directed signals received via the diplexer 44 onto an optical signal for transmission on the upstream directed optical trunk 14'. The optical receiver 42 is for demodulating downstream directed signals from the optical signal carried on downstream optical trunk 14 and transferring the demodulated downstream directed signal to the diplexer 44.

The diplexer 44 outputs onto coaxial trunk 18 the downstream directed signals that are demodulated by the optical receiver. Likewise, the diplexer 44 receives from the coaxial trunk 18 upstream directed signals for modulation by the laser transmitter 40. The individual links of the coaxial trunk 18 are interconnected by bidirectional amplifiers 20 and taps 22. Taps 22 are also provided for connecting coaxial drop lines 22 to the coaxial trunk 18. The coaxial drop lines 22 connect the subscriber locations 26 to the coaxial trunk 18 for upstream and downstream directed communication.

The optical trunks 14, 14', coaxial trunks 18, taps 20 and coaxial drop lines 22 define a shared communications medium over which communicated signals are transmitted or received by all connected network devices, such as subscriber stations at the subscriber locations 26 and the head end 12. The cable network 10 is specifically designed to deliver information in the downstream direction from the head end 12 to the subscriber locations 26. For downstream directed communication, frequency division multiplexed communication channels are defined which have mutually unique carrier frequencies and non-overlapping bands (6 MHz bands in North America and other NTSC cable TV systems, 8 MHz bands in Europe and other PAL and SECAM cable TV systems) in the band from 54 MHZ up to the upper cut-off frequency of the coaxial trunks 18 and drop lines 22 (typically, 500–750 MHZ). This is also known as sub-split cable network. Each 6 MHz downstream channel can carry either traditional analog NTSC composite video signals or digitally encoded data appropriately modulated by a RF carrier. Each traditional broadcast video programs are each transmitted in a separate communication channel by modulating an NTSC signal onto a predetermined carrier signal having an assigned carrier frequency and transmitting the signal from the head end controller 28.

Although the cable network 10 has a large amount of bandwidth, the cable network 10 presents certain challenges for providing high speed and high capacity upstream transmission from a large number (typically a few hundred) of subscriber locations 26. Most notably, the subscriber locations 26 may be distributed over a large geographic area. The signal path (i.e., sum of the lengths of the coaxial drop lines 22, coaxial trunk links 18 and optical trunk links 14) between individual subscriber locations 26 or subscriber locations 26 and the cable head end 12 can be on the order of tens of kilometers. Such long signal paths introduce noticeable delays in the transmission of signals which tend to be about 5 $\mu$s/kilometer.

Recognizing such challenges, the IEEE 802.14 standards body has proposed a communication scheme as follows. Two channels are defined for communication, namely, an upstream directed channel (UC) and a downstream directed channel (DC). Subscriber stations (SSs) 50 (FIG. 2), such as cable modems, set top boxes or data terminals, at subscriber locations 26 can transmit on the upstream directed channel UC but can only receive on the downstream directed channel DC. The head end 12 can only receive on the upstream directed channel UC and only transmit on the downstream directed channel DC. In other words, the upstream channel UC is a multi-point to point channel whereas the downstream channel DC is a point to multi-point channel. These channels UC and DC are said to be multiple access channels, meaning that multiple network devices (SSs 50, head end 12, etc.) are permitted to access each channel UC or DC. As such, although the physical topology of the cable network 10 is a tree and branch configuration, the communication channels UC and DC may be illustrated as a logical bus network as shown in FIG. 2.

Each channel UC and DC is assigned a different frequency band and center frequency, such as is shown in FIG. 3. As shown, the upstream channel UC may be assigned a band in the 5–42 MHz band not already used for control message communication. The downstream channel DC may be assigned one of the unused 6 MHZ bands, i.e., not currently used for communicating traditional broadcast video programming. The DC channel is divided into time slots and the UC channel is divided time slots ("slots") and mini-time slots ("mini-slots"). Point-to-point or multicast communication is achieved by reading packets from, or writing packets into, the slots and mini-slots in a time division multiplexing or time division multiple access fashion. (Herein, a "packet" is an organization of a bitstream into discrete units. A packet may include control or overhead information, typically located in a header section of the packet, and user message or user data information in a "payload" section of the packet. The term "payload" is used herein more generally to refer to a channel for carrying communicated data or messages.) In order to read a packet from a channel, the particular channel is tuned (the frequency band of that channel is filtered out of the signals carried on the shared medium), and a packet is demodulated from a respective slot or mini-slot time period of the carrier signal. Likewise, in writing a packet to a channel, a packet is modulated onto a carrier signal of that channel and the modulated carrier signal is transmitted at the appropriate slot or mini-slot time period of the carrier signal and combined with the other signals carried on the shared medium.

It should be noted that the cabling distance (i.e., signal path) between any two SSs 50 and the head end 12 or the mutual cabling distance between any two SSs 50 can widely vary in the cable network 10. As such, a wide disparity of propagation delays may be incurred by each signal transmitted to or from an SS 50 depending on its relative distance to the head end 12. Assuming that the SSs 50 are synchronized to a system clock at the head end 12 using a time-stamping technique (to be detailed later), a packet transmitted at "the same time" from different SSs 50 will arrive at the head end 12 at different times. The difference can be on the order to tens of $\mu$sec. If not properly compensated, a large guard time must be inserted between each packet transmission, resulting in a very inefficient time division multiplexing (TDM) transmission in the upstream channels. To overcome this problem, the following procedure has been proposed in the IEEE 802.14 standard. Each SS 50 is polled and transmits a signal to the head end 12. The head end 12 records the propagation delay of each SS 50. The head end 12 then informs each SS 50 of how long a propagation delay is incurred by signals transmitted from that specific SS 50 to the head end 12. Each SS 50 is also informed of the maximum propagation delay of all SSs 50 in the cable network 10. Whenever a SS 50 decides to transmit a signal, the SS 50 determines the slot or mini-slot boundary at which it desires to write its packet. The SS 50 then delays its transmission from the slot or mini-slot boundary for a certain time period equal to the difference between the propagation delay of the transmitting SS 50 and the maximum propagation delay in the cable network 10. The net effect is that all signals received at the head end 12 "appear" to incur the same propagation delay as the SS 50 that incurs the maximum propagation delay.

Each SS 50 is assigned a unique identifier or address. Each packet written into each slot contains at least the address of the destination, i.e., the SS 50, which is the ultimate intended recipient of the packet. A SS 50 transmits information to another SS 50 or to the head end 12 by dividing the information into packets and writing the packets into allocated slots of the upstream channel UC. Such packets are transmitted by the upstream channel UC to the head end 12 which reads each packet from each time slot. The head end 12 examines the destination address in the header of the packet. The head end 12 writes the packet into an available slot of the downstream channel DC. The packets are broadcasted in the downstream channel DC and are read from the slots by each SS 50. Each SS 50 compares the destination address of the received packets to its assigned address or to the group (multicast) addresses assigned to the multicast groups to which the SS 50 has subscribed. If the addresses match, the packet is accepted. Otherwise, the packet is discarded.

As will be described in greater detail below, two types of packets are transmitted in the channels UC and DC, namely, "payload" packets and "control" packets. Payload packets carry user messages or user data to be communicated to a destination. Control packets carry control messages for allocating portions of the communication channels or other overhead control information. For reasons described below, SSs 50 write control packets into mini-slots of the upstream channel UC and write payload packets into slots of the upstream channel UC. The head end 12 writes payload and control packets into slots of the downstream channel DC. For example, each slot of the downstream channel DC accepts a frame which includes one payload packet and one control packet. This is possible because only the head end 12 writes control and payload packets into slots of the downstream channel DC.

Some manner must be provided to prevent each SS 50 from attempting to write packets into the same time slot of the upstream channel UC. To that end, a slot assignment-reservation protocol is implemented according to which each SS 50 may only write packets into slots that have been assigned to that SS 50. Each SS 50 can attempt to reserve slots (i.e., request an assignment of one or more slots) by writing a reservation request control packet into a mini-slot of the upstream channel UC allocated for receiving new reservation request packets. The reservation request control packet may indicate the address or identifier of the SS, the number or size of slots needed for the to-be-communicated payload packets, (conventionally, the slot length may be an integral number of mini-slot lengths and thus the number of slots needed may be expressed as the number of "mini-slot" lengths needed), the type of the communication for which slots are requested and an error check sequence (e.g., a cyclical redundancy check or CRC). The head end 12 receives the reservation request control packets from the mini-slots and responds by assigning one or more slots to each requesting SS 50. The head end 12 then writes control packets into slots of the downstream channel DC indicating which slots were assigned to each SS 50. Each SS 50 receives control packets that respond to its respective reservation request and then transmits its payload packets only in its assigned slots. Because SS's 50 only transmit payload packets in their assigned slots, no other SS 50 contends to simultaneously access the same slot. Contention is therefore localized to relatively small size reservation mini slots, and not the relatively lengthy payload packets. Consider that each slot or mini-slot accessed by more than one SS 50 simultaneously (thereby resulting in a collision) is wasted. As such, the use of mini-slots enables the SSs 50 to obtain access to the larger slots in a fashion that conserves the bandwidth.

The payload packets are received at the head end 12. The head end 12 identifies each received payload packet destined to a SS 50 in the cable network 10, and writes each of the identified packets into an available slot of the downstream channel DC. Each SS 50 receives from the downstream channel the payload packets destined thereto.

Nevertheless, contention exists in accessing the mini-slots. Such contention is resolved using a feedback mechanism and a collision resolution algorithm (CRA). The head end 12 monitors each mini-slot and determines if a collision has occurred. If the head end 12 detects a collision, the head end 12 transmits a message via the downstream channel DC indicating in which slots a collision was detected. Each SS 50 that has attempted to transmit a reservation request packet monitors the messages transmitted in the downstream channel DC. If an SS 50 receives a message from the head end 12 indicating that a collision has occurred in the same mini-slot in which the SS 50 had previously attempted to write its reservation request packet, the SS 50 determines that its reservation request packet had collided with another transmission by another device and therefore was not received by the head end 12. In such a case, the SS 50 executes a CRA to determine whether and when to attempt to retransmit its reservation request packet. Several CRA's are known such as "ternary tree," and "P-persistent and DQRAP." See P. Jacquet, P. Muhlethaler & P. Robert, *Asymptotic Average Access Delay Analysis: Adaptive P-Persistence Versus Tree Algorithm,* IEEE P802.14, Doc. no. IEEE 802.14-96/248 (1996), and U.S. Pat. No. 5,390,181.

It is desirable to reduce contention to increase the utilization of the bandwidth in the upstream and downstream channels UC and DC and, at the same time, accommodate as large a number of SSs 50 as possible. Generally, this is achieved by increasing the ratio of mini-slots to payload slots in the upstream channel UC and decreasing the size of the mini-slots in the upstream channel UC. U.S. Pat. Nos. 5,012,469 and 5,390,181 describe different variations in the ratio and arrangement of mini-slots to payload slots in the upstream channel UC. The upstream spectrum 5–42 MHz of a sub-split HFC cable network is susceptible to noises and interference that can limit the amount of spectrum available for reliable transmissions. The noises are, most notably, "ingress noise" and "impulse noise." Ingress noise occurs because the coaxial cabling of the trunks 18 and drop lines 22, with imperfect shielding due to corroded connectors, cracked sheath, etc., function as antennas. Different radio transmissions are picked up by the shared medium, such as citizen band (CB) radio broadcasts at around 24 MHZ, short wave radio transmissions at various points in the 5–42 MHZ band, etc., and contribute to ingress noise. Impulse noise, on the other hand, results from noise spikes that occur from other phenomenon such as lightning strikes of the coaxial cabling. The coaxial cabling of the trunks 18 may also carry an electrical power signal for supplying power to the various devices (e.g., amplifiers 20) of the cable network. Power line arching through weak points of the cables and connectors also contribute to the impulse noise.

In order to reliably transmit control packets, such as reservation request packets, in mini-slots, a binary phase shift keying (BPSK) modulation technique or quaternary phase shift keying (QPSK) modulation technique is often used. On the other hand, to maximize the amount of data transmitted in payload packets, a high order quadrature amplitude modulation (QAM) technique such as 16-QAM, 64-QAM or even 256 QAM, with powerful forward error correction (FEC) is often used. However, spectral efficient modulation schemes, such as 16-QAM, 64-QAM and 256-QAM, require longer preambles for carrier recovery and burst synchronization and incur a much higher per burst overhead for mini-slots. That is, each SS 50 actually writes a frame into each mini-slot time period, including an inter-burst guard time period and a preamble, that precede the actual mini-slot control packet, such as is shown in FIG. 4. (FIG. 4 also shows the mini-slot packet structure as including an address or identifier, payload packet or communication type indicator, number of requested mini-slots field and CRC field.) The devices of the cable network 10 may use raised cosine filters. Such filters introduce a ringing into the channel. In addition, transmitters and receivers of the SSs 50 and head end 12 need a finite amount of time to turn on and off in order to read and write packets into specified slots. The purpose of the guard time period is to provide sufficient time for the ringing to dampen and to enable the transmitter or receiver circuitry of the SSs 50 and head end 12 to turn on or off. Following the guard time period is a "burst" or combination of a preamble and modulated data. The purpose of the preamble is to enable a receiver to fine tune to the carrier frequency of the carrier signal on which the data is modulated and to align in phase to the carrier signal, prior to sampling the carrier signal and demodulating data from the carrier signal. This synchronization and alignment operation is referred to as "burst sync." Longer preambles are required when spectral efficient, higher order QAM schemes are used to ensure very fine tuning thereby ensuring highly accurate sampling and demodulation. The impact of such effects on mini-slot efficiency are more pronounced as the order of the QAM increases, as depicted in FIG. 5. That is, a larger percentage of the time of the upstream channel UC is allocated to mini-slots as the order of the QAM increases.

To increase the utilization of the upstream channel UC, a technique of varying the time division pattern of the upstream channel UC into mini-slots and slots has also been proposed. This is illustrated in FIG. 6. At the top of FIG. 6, a fixed time division pattern of the upstream channel UC into slots and mini-slots is shown. The disadvantage of this technique is that much of the upstream channel UC capacity must be allocated to mini-slots to account for a typical worst case, or heavy load (numerous attempts to access mini-slots), scenario. In the alternative conventional technique, the ratio of mini-slots to slots can be dynamically varied by rearranging the pattern according to which the upstream channel is time divided into slots and mini-slots. This is depicted at the bottom of FIG. 6. For example, when the load is anticipated to be light (few attempts to access mini-slots), the ratio of mini-slots to slots is reduced. When the load is anticipated to be heavy, the ratio of mini-slots to slots is increased. However, this technique has the following disadvantages:

(1) It is complex to implement.
(2) It is difficult and imprecise to predict the load based on past history, thereby risking a potential stability problem.
(3) It imposes additional constraints on the mini-slot, such as requiring that slots lengths be equal to an integral multiple of mini-slot lengths, further reducing the utilization of the upstream channel UC for payload data.

U.S. Pat. No. 5,278,833 describes a wireless network including a base station and "communication units," such as cellular or cordless phones. This patent describes the circuitry and communication formats in detail. Therefore, only certain details of this wireless communication system are repeated herein. A frequency division multiplexing technique is used to form two channels, namely, an upstream channel having a first band, and a downstream channel, having a second, non-overlapping band. As above, the upstream channel is used for transmitting information from the communication units to the base station and the downstream channel is for communicating information from the base station to the communication units.

Like the cable network 10, a time division multiplexing technique is used to divide each of the upstream and downstream channels into time slots. Each of the time slots may be assigned by the base station for communication between a selected communication unit and the base station. Unlike the cable network 10, the upstream channel is divided only into uniform sized time slots. However, whenever a time slot of the upstream channel is not used for ordinary payload communication, it can be divided into two or more equally sized sub-slots for transmitting control information. A communication unit can communicate by transmitting a request packet in one of the sub-slots of a time slot not previously assigned for payload communication. The base station receives such request packets, determines how many time slots are necessary for the communication unit to communicate, and transmits a control packet in a time slot of the downstream channel indicating which slots are assigned to the communication unit. The communication unit then transmits its packets in its assigned time slot. No contention resolution protocol is specified for transmitting reservation requests. Nor does this patent explain how a communication unit determines that a time slot of the upstream channel is not assigned for payload communication. Finally, note that the upstream channel cannot carry both reservation request packets and payload packets simultaneously. The upstream channel capacity is therefore allocated to each of these kinds of packets thereby reducing the utilization of the upstream channel for carrying payload information.

U.S. Pat. No. 5,012,469 discloses a satellite communications network. The satellite communications network includes plural earth stations that communicate with a satellite station. The communication is bidirectional using a single contentious channel. The channel is time division multiplexed according to one of a number of different formats depending on the traffic load. According to one format, under certain circumstances, the channel is divided into "large slots" which include one payload time slot and a fixed number of mini-slots. Each mini-slot is uniquely assigned to the earth stations for writing reservation request packets (requesting reservation of payload time slots) for transmission to the satellite station. Under other circumstances, the channel is divided into payload time slots only, and the payload time slots are uniquely assigned to each earth station. As circumstances, such as the traffic load, change, the channel is formatted according to the appropriate one of the two formats. According to a second format, the channel is formatted in one of three different ways, including the two formats mentioned above and a third format in which the channel is divided into time slots which are accessed by the earth stations in a contentious fashion. Again, the channel is formatted according to one of the three different formats depending on the circumstances. In addition to the disadvantages mentioned above for the wireless and cable networks, the architecture suggested in this patent is highly complex.

It is an object of the present invention to overcome the disadvantages of the prior art.

SUMMARY OF THE INVENTION

This and other objects are achieved by the present invention. Illustrative environments of use of the present invention are a wireless network, a satellite network, a cable network, etc. In a cable network, a head end is provided as a central controller, a shared medium is provided and multiple stations, namely, subscriber stations, are connected to the head end via the shared medium. Illustratively, the head end transmits one or more traditional broadcast video programs by modulating them onto one or more carrier signals and transmitting the carrier signals on the shared medium. Such traditional broadcast programs may thus be contemporaneously received at each subscriber station. Frequency bands not used for traditional broadcast video programming are assigned for providing point-to-point or multicast communication.

To provide such point-to-point or multicast communication, according to the invention, three types of communication channels, namely, one or more upstream payload channels, one or more upstream control channels and one or more downstream channels, are allocated. At least one upstream control channel, at least one upstream payload channel, and at least one downstream channel can carry bitstreams simultaneously; a bitstream may be simultaneously carried on the upstream control and upstream payload channels of a shared medium during overlapping periods of time. Such simultaneous channels may be defined according to a number of modulation techniques such as frequency division multiplexing, code division multiplexing, synchronous code division multiple access, or a multi-carrier modulation technique. For example, according to an FDM technique, each channel has its own carrier signal and carrier frequency. Illustratively, the carrier signal of the channels furthermore have mutually non-overlapping bands. Each bitstream is furthermore illustratively organized into packets.

Each channel illustratively is divided into slots or mini-slots. Each upstream payload channel is assigned for carrying upstream directed payload bitstreams from the stations to the central controller. Each upstream control channel is assigned for carrying upstream directed control bitstreams, such as reservation request bitstreams requesting reservation of time slots of the upstream payload channel, from the stations to the central controller. Each downstream channel is assigned for carrying at least downstream directed control bitstreams, such as bitstreams containing acknowledgments and also containing indications of assigned slots in the upstream payload channel, from the central controller to the stations. Each downstream channel illustratively also carries the collision status of collided reservation request mini-slots. The downstream channel may also illustratively carry payload bitstreams.

Illustratively, stations may write reservation request bitstreams into mini-slots of the upstream control channel. Such reservation request bitstreams are received by the central controller, which responds by assigning specific slots to each station. The central controller writes control bitstreams in the downstream channel indicating the slot assignment which are received by the respective stations that issued the reservation request bitstreams. Each station then writes its payload bitstreams only in assigned slots of the upstream payload channel. Illustratively, the payload bitstreams are received by the central controller. If the received payload bitstreams are destined to a station in the network, the central controller writes such payload bitstreams into slots of the downstream channel. Each station receives the payload bitstreams transmitted in the downstream channel, accepts the bitstreams destined thereto, and discards each other payload bitstream.

According to one embodiment, a station communicates on a shared medium of a network as follows. The station transmits a bitstream containing a request to reserve one or more slots of an upstream payload channel on an upstream control channel. The station then receives multiple bitstreams from a downstream channel, including at least one bitstream containing an indication of one or more slots of the upstream payload channel assigned to the station for transmitting packets. The station then transmits payload bitstreams on the upstream payload channel, but only at the assigned slots of the upstream payload channel. The bitstreams are carried simultaneously on the upstream control channel and the upstream payload channel of the shared medium during overlapping time periods.

According to another embodiment, a central controller of a network enables communication of bitstreams from a station via a shared medium of the network as follows. The central network controller receives from an upstream control channel, a reservation request bitstream, requesting reservation of slots for a particular station. The central network controller transmits on a downstream channel, a bitstream including an indication of one or more slots assigned to the particular station. The central network controller receives a bitstream from one of the assigned slots of an upstream payload channel. Again, the bitstreams are carried simultaneously on the upstream control channel and the upstream payload channel of the shared medium during overlapping time periods.

By transmitting reservation request packets and upstream directed payload packets on separate "simultaneous" channels, each channel can be utilized to its fullest potential. For example, different modulation techniques can be used on each channel, such as BPSK, QPSK, n-QAM, orthogonal frequency division multiplexing (OFDM), discrete multi-tone modulation (DMT), discrete wavelet multi-tone modulation (DWMT), code division multiple access (CDMA), synchronous code division multiple access (SCDMA), etc. This maximizes efficiency of the upstream payload channel yet ensures high reliability and short mini-slot size on the upstream control channel. By reducing the mini-slot size, the likelihood of collision on the upstream control channel decreases, and retransmission delays in the event of collisions can be overall reduced (depending on the collision resolution technique utilized). Likewise, by removing mini-slots from the upstream payload channel, the channel utilization for payload packets is maximized, even while using higher spectral efficiency modulation techniques. Thus, the competing demands of reservation request packets and payload packets can be satisfied without detriment to each other.

The multiple access method can simplify multiple channel support for expanded bandwidth demand and can maximize the number of supported subscriber stations. To increase the capacity, each upstream payload channel or each downstream payload channel can be added to the network. To minimize contention and lower the access delay of the multiple access network, the stream of mini-slots in the upstream control channel can be enhanced by allocating a wider bandwidth, or assigning some subscriber stations to different upstream control channels.

DETAILED DESCRIPTION OF THE INVENTION

Figure 1:
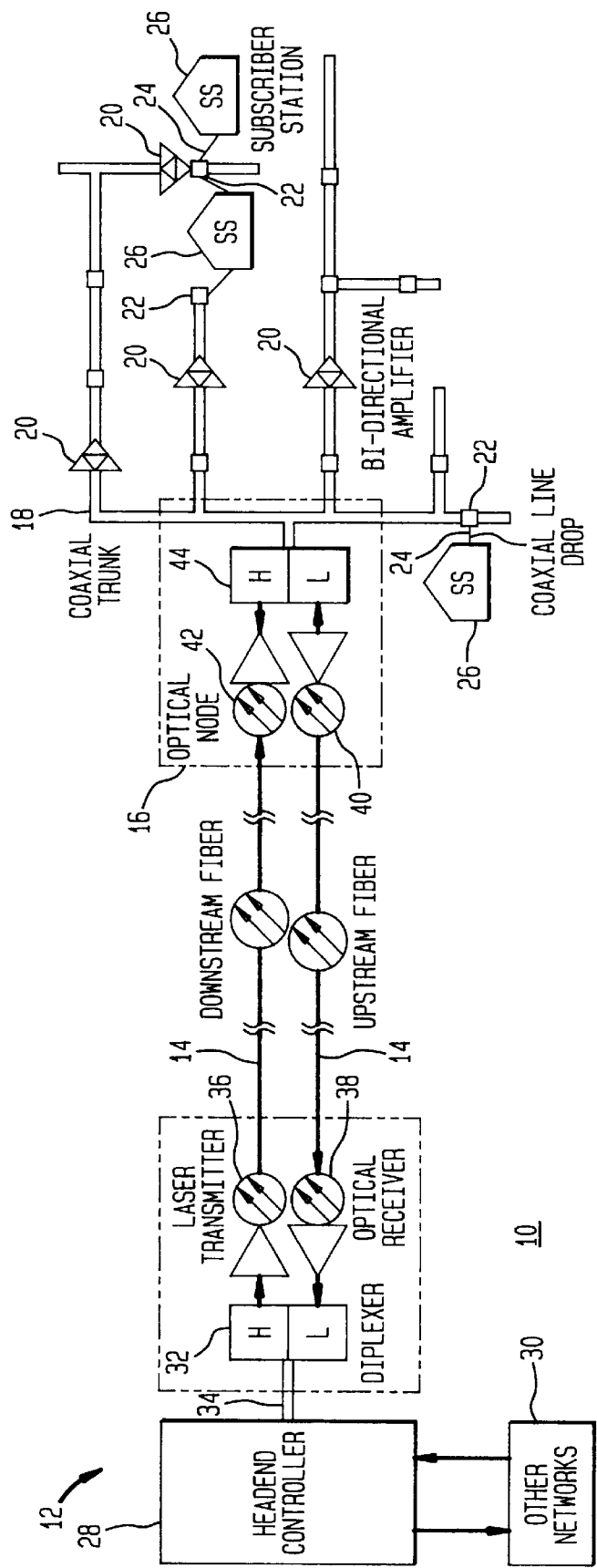
FIG. 1 shows a conventional HFC cable network.

The present invention may be implemented in any kind of network, such as a wireless network, a satellite network, a cable network, etc. For sake of convenience, this invention is illustrated in detail for a two way HFC cable network (HFC network) having a tree and branch physical topology, similar to the conventional topology shown in FIG. 1. As such, the present invention is readily usable with existing cable networks with limited modification for two-way operation. In this illustration, the central controller is the head end, the stations are the subscriber stations and the shared medium is the optical fiber and coaxial cabling that connects the head end, fiber nodes and subscriber stations.

Figure 7:
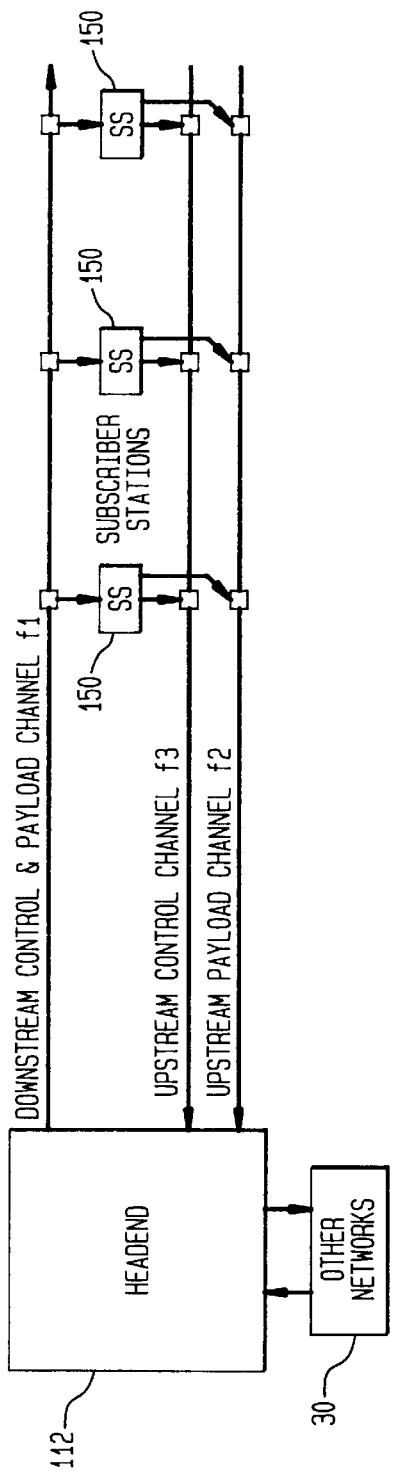
FIG. 7 shows a logical bus network according to the present invention.
Figure 8:
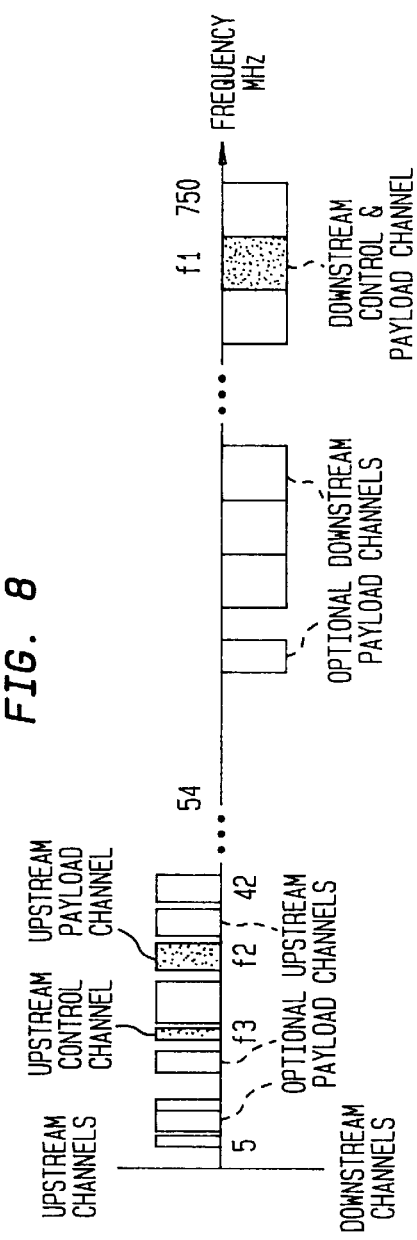
FIG. 8 shows an allocation of frequencies to channels according to an embodiment of the present invention.

According to the invention, three types of communication channels are provided (in addition to the other channels for carrying traditionally broadcast programs in the downstream direction). The three types of communication channels are a downstream control and payload channel DCPC, an upstream control channel UCC and an upstream payload channel UPC. At least one of each type of the three channels described is needed for the communication network in this invention. A logical network configuration according to the present invention is shown in FIG. 7. The upstream control channel UCC and the upstream payload channel UPC can carry bitstreams simultaneously. That is, different bitstreams may be simultaneously carried on the upstream payload channel UPC and the upstream control channel UCC during overlapping periods of time. Such "simultaneous" channels can be defined using a number of modulation techniques such as FDM, OFDM, DMT, DWMT, CDM, FM, etc. For sake of illustration this invention is illustrated using an FDM technique wherein each of the three communication channels DCPC, UPC and UCC has a unique carrier frequency, f1, f2 or f3, respectively, and mutually non-overlapping bands, as shown in FIG. 8. For example, the UCC and UPC channel bands are located between 5 and 42 MHZ whereas the DCPC channel band is between 54 and the upper cut-off frequency of the cable network (typically 750 MHZ, but can be as high as 1 GHZ). Each downstream channel, including the downstream control and payload channels DCPC are allocated bands in units of 6 MHZ (in North America, according to NTSC TV channel convention). The upstream channels, including the upstream control channel UCC and the upstream payload channel UPC are allocated bands of various bandwidths, typically from 100 KHz to 6 MHz, wherever a low noise sub-band in the band from 5–42 MHZ can be found.

Figure 2:
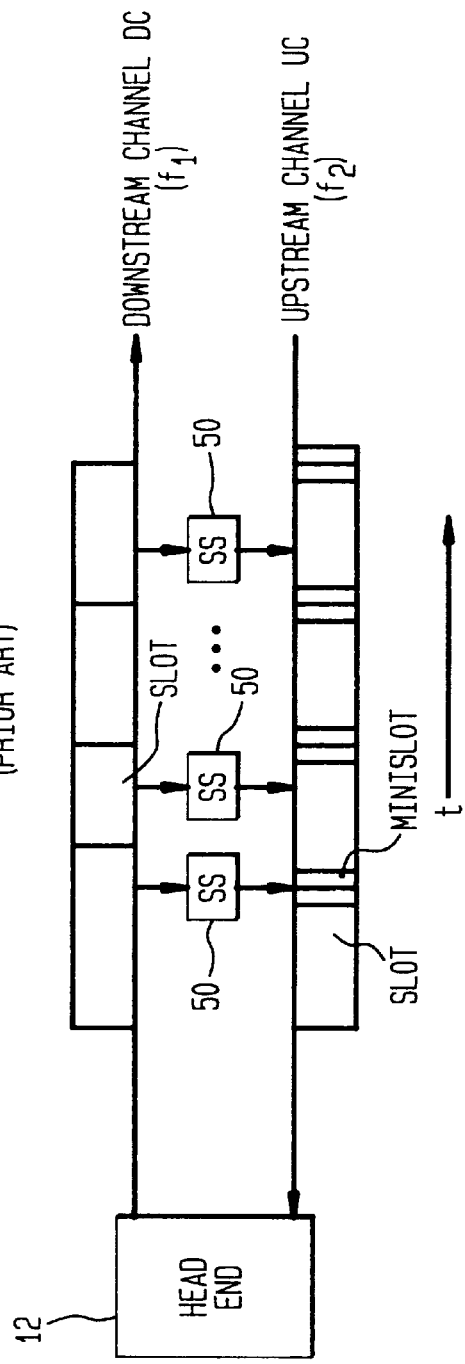
FIG. 2 shows a conventional logical bus assignment of channels in a HFC cable network.

Referring again to FIG. 7, the downstream control and payload channel DCPC serves the same purpose as the downstream channel DC in FIG. 2 and is divided into slots. The upstream control channel UCC is divided into mini-slots only for carrying control packets such as reservation request packets. On the other hand, the UPC is divided into slots only for carrying payload packets. As before, SSs 150 can write in one of the designated slots according to a retransmission rule of the upstream channels UPC and UCC and can only read packets from the slots of the downstream control and payload channel DCPC. Likewise, the head end 112 can only write packets in the slots of the downstream control and payload channel DCPC and can only read packets from the slots and mini-slots of the upstream channels UPC and UCC. Furthermore, the SSs 150 can write packets only in assigned slots of the upstream payload channel UPC. The SSs 150 can also freely write packets in mini-slots of the upstream control channel UCC, designated according to a retransmission rule, subject only to contention from the other SSs 150. Alternatively, the mini-slots may be accessed in a contention free manner by polling the SSs 150 or by uniquely and fixedly assigning each mini-slot to each SS 150. In yet another scheme, a mix of contentious and fixedly assigned mini-slots are provided.

Figure 3:
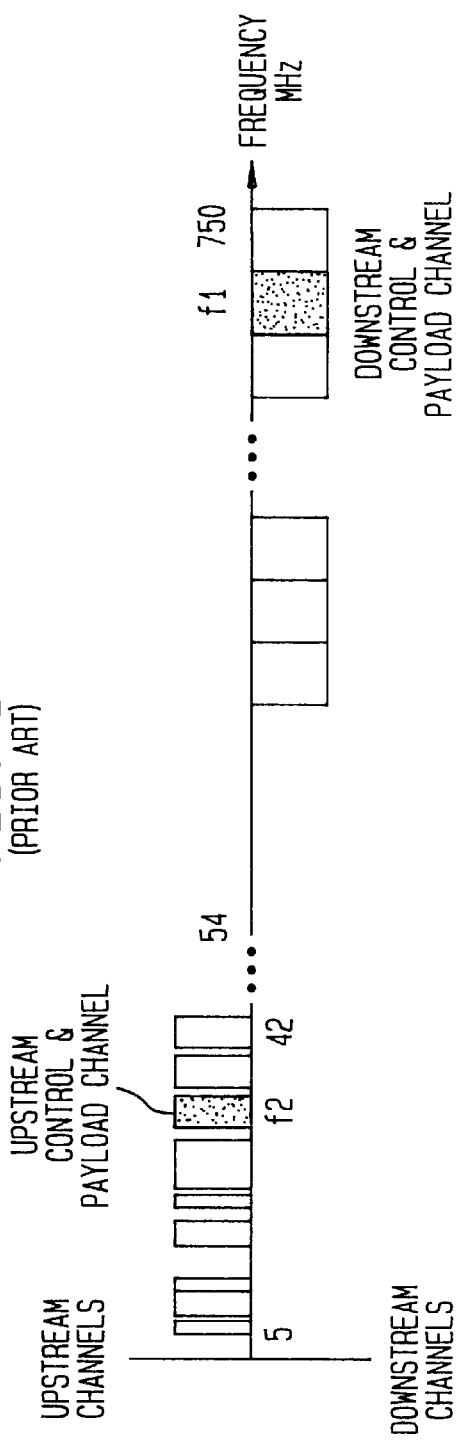
FIG. 3 shows a conventional allocation of carrier frequencies and bands to channels.
Figure 4:
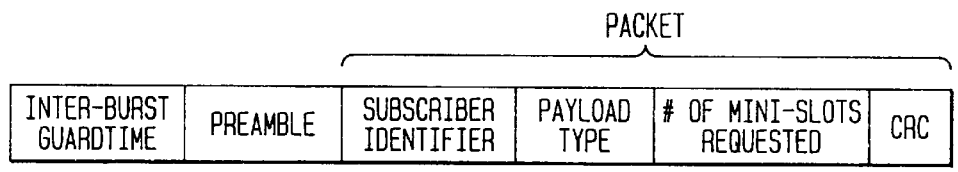
FIG. 4 shows a conventional mini-slot frame.
Figure 5:
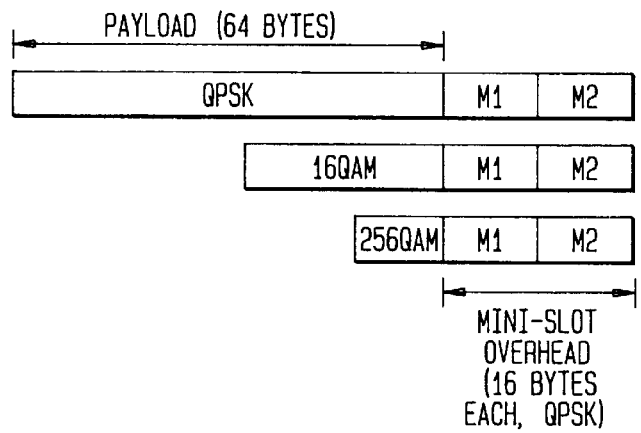
FIG. 5 shows a conventional division of an upstream channel into slots and mini-slots using different modulation techniques.
Figure 6:
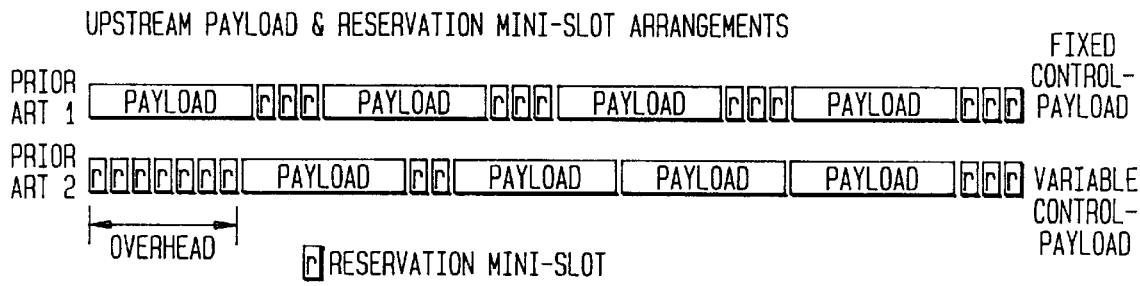
FIG. 6 shows conventional fixed and dynamic patterns for dividing the upstream channel into slots and mini-slots.
Figure 9:
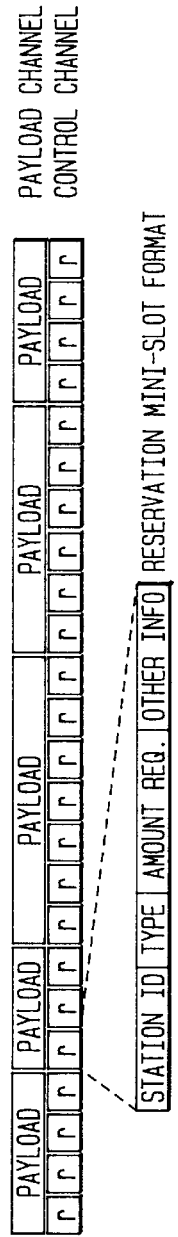
FIG. 9 shows upstream control channel UCC and upstream payload channel streams according to an embodiment of the present invention.

Thus, unlike the channel architecture of FIGS. 2 and 3, the channel architecture of FIGS. 7 and 8 requires that contention free transmission of upstream directed payload packets in slots and contentious transmission of upstream directed reservation request packets in mini-slots occur in different frequency division modulated channels in different frequency bands. This is illustrated in FIG. 9, wherein the upstream payload channel UPC carries a stream of only payload packets in slots (which may be fixed or variable in size). Simultaneously, the upstream control channel UCC carries a stream of only reservation request packets in mini-slots (which illustratively are of a fixed size). As such, both kinds of transmissions can occur simultaneously, without interfering with each other or otherwise constraining each other. For instance, the packets transmitted on the upstream payload channel UPC may be n-QAM (where n=16, 64, 256 . . . ), QPSK, etc., modulated and the packets transmitted on the upstream control channel UCC may be BPSK, QPSK, . . . etc. modulated. As such, the mini-slot frames may begin with relatively shorter preambles (not shown). Each control packet written in a mini-slot frame may include a subscriber station address or identifier, an identifier of the type of communication for which the slot(s) is (are) requested, the size or number of slots requested and other information (e.g., error check and/or correction codes or sequences, etc.).

FIG. 10 shows the circuitry in a subscriber station 150 used to adapt the subscriber station 150 according to an embodiment of the invention. FIG. 10 does not show conventional circuitry which also may be present in a subscriber station 150 for receiving traditional broadcast channels, for transmitting requests to receive pay-per view events, for processing data, for receiving and digitizing voice or video, etc. The coaxial drop line 22 is connected to a diplexer 152. The diplexer 152 separates the downstream receive channel bands from the upstream transmit channel bands. The downstream channel signals, including the downstream control and payload channel DCPC signal, are outputted to a downstream RF receiver 154. Likewise, the upstream control channel and upstream payload channel signals (if any are present) outputted from the upstream RF transmitters 156 are combined by the diplexer 152 for output onto the coaxial drop line 22.

The received signals outputted from the diplexer 152 to the downstream RF receiver 154 are inputted to a frequency agile tuner 158. As shown, the frequency agile tuner 158 receives a signal indicating the carrier frequency (or center frequency) of f1 and channel bandwidth thereby causing the frequency agile tuner 158 to filter out only the downstream control and payload channel DCPC frequency band.

The filtered out downstream control and payload channel DCPC signal is inputted to a receiver/demodulator, forward error corrector, deinterleaver and decoder 160. The receiver circuit 160 performs the inverse functions of the transmitter circuit 260 (see FIG. 14). Illustratively, some of these subcircuits are optional and are merely included for sake of illustration. See ITU-T Recommendation J.83, Digital Multi-Programme Systems for Television Sound and Data Services for Cable Distribution, Oct., 1995. The circuit 160 includes a receiver/demodulator which receives and demodulates the packet data from the carrier signal (or signals) assigned to the downstream control and payload channel DCPC. Such received packets are outputted to a subscriber media access control circuit 162.

The subscriber media access control circuit 162 outputs payload packets and reservation request packets at the appropriate time to the upstream RF transmitters 156. Payload packets are received at an encoder, interleaver, forward error corrector and modulator 176. The forward error corrector adds forward error correction bits to the packet data. The modulator modulates the packet onto a carrier signal, e.g., using a QPSK modulation technique, a 16, 64 or 256-QAM modulation technique, etc. The modulated carrier signal is outputted to a frequency agile tuner 178. The frequency agile tuner 178 also receives an indication of the carrier signal or center frequency f2 and bandwidth assigned to the upstream payload channel UPC. In response, the frequency agile tuner 178 shifts the modulated carrier signal to the band assigned to the upstream payload channel UPC. Illustratively, the indication of the frequency can be varied to change the frequency band to which the frequency agile tuner 178 shifts the modulated signal e.g., to avoid noisy portions of the 5–42 MHZ band.

The reservation request packets are outputted from the subscriber media access controller 162 to an encoder and modulator 182. The encoder subcircuit of the circuit 182 may perform a different encoding than the encoder subcircuit of the circuit 176 performs, which different encoding is appropriate for the particular modulation technique employed in the modulator 182. Illustratively, the modulator 182 modulates the reservation request packet using a BPSK or QPSK modulation technique. The modulated signal is outputted to frequency agile tuner 184. As shown, the frequency agile tuner 184 receives an indication of the frequency f3 assigned to the upstream control channel UCC. As such, the frequency agile tuner 184 shifts the modulated signal to the frequency band assigned to the upstream control channel UCC. Like the frequency agile tuner 178, the indication of the frequency can be varied so that the frequency agile tuner 184 shifts the modulated signal to a selectable frequency band.

The modulated carrier signals for the upstream payload channel UPC and the upstream control channel UCC are inputted to an RF amplifier 180. The RF amplifier 180 outputs the amplified upstream payload channel UPC and upstream control channel UCC signals to the diplexer 152. The diplexer 152 outputs the upstream payload channel UPC and upstream control channel UCC signal onto the coaxial drop line 22 for transmission to the head end 112 (FIG. 7).

The filtered out downstream control and payload channel DCPC signal is inputted to a demodulator, forward error corrector, deinterleaver and decoder 160. Illustratively, not all of these subcircuits are needed to implement the invention. The circuit 160 includes a demodulator/receiver which demodulates the packet data from the carrier signal (or signals) assigned to the downstream control and payload channel DCPC.

The subscriber media access controller 162 may be implemented using one or more integrated circuit chips. The subscriber media access control circuit 162 can be implemented using a programmable processor or a finite state automata. Below, the subscriber media access control circuit 162 is described as containing several subcircuits for sake of convenience.

Figure 11:
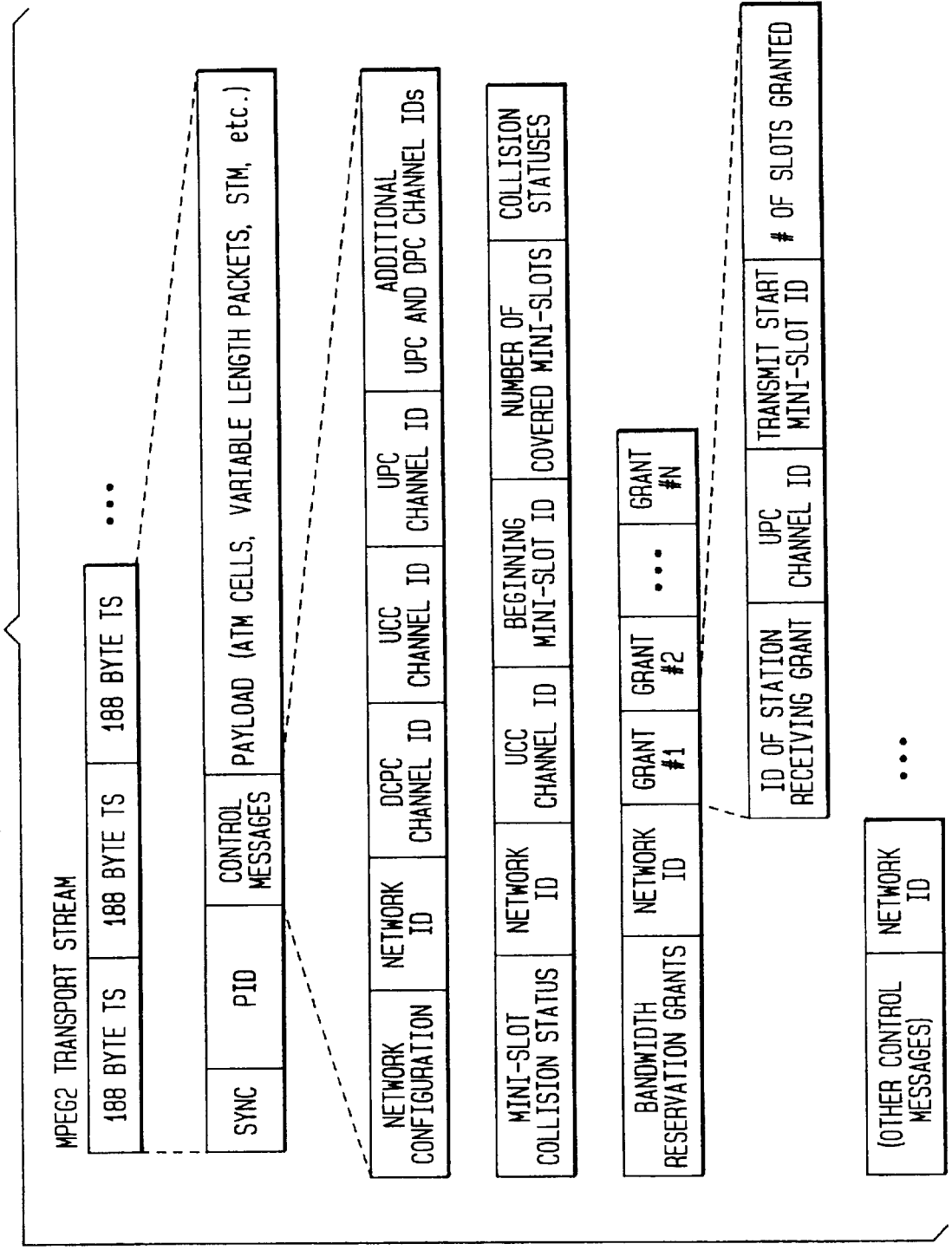
FIG. 11 shows a packet structure for packets transmitted in the downstream channel.

Illustratively, packets received from the downstream control and payload channel are MPEG-2 transport stream packets into which other message packets, packet fragments or cells may be inserted, such as is shown in FIG. 11. According to the MPEG-2 systems standard, each transport packet is 188 bytes long with a four byte header and a 184 byte message carrying portion (commonly referred to as "payload" which should be distinguished from the usage of the term payload herein). The MPEG-2 transport stream packet includes a synchronization word and a 13-bit packet identifier or "PID." Other control information is also present in the transport stream packet header. A group of reserved PIDs will be used by circuit 162 to separate the MPEG-2 payloads (carrying digital video programs) from other types of control and data (such as internet packet segments, ATM cells or STM bitstreams).

The message carrying portion of the packet includes two packets, namely, a "control" packet followed by a "payload" packet. The downstream control demultiplexer 166, demultiplexes the control packet. The control packet may include a mini-slot collision status message (the purpose of which is described in greater detail below), bandwidth reservation grants and other control information. As shown, the bandwidth reservation grant field may include an upstream payload channel field, a transmit start slot ID field and a number of slots granted field. The upstream payload channel field includes an address or identifier of the destination SS. The subscriber media access controller 162 determines whether or not the address in this field matches the address of the SS 150 in which the subscriber media access controller 162 resides or a multicast address of a multicast group to which this SS 150 has subscribed. If not, the control information in the transmit start slot ID field and number of slots granted field are destined to another SS and this information is discarded. If the addresses match, the information in the transmit start slot ID field and number of slots granted field is destined to the SS 150 in which the subscriber media access controller 162 is located and the information is processed as described below.

The downstream payload demultiplexer 164 demultiplexes and reassembles the packet data in the payload packet. The payload packet may contain messages, internet packet segments, a synchronous transfer mode (STM) bitstream, asynchronous transfer mode (ATM) cells, etc. Using header information in the payload packet, the subscriber media access controller 162 determines whether the payload packet data is destined to the SS 150 in which the subscriber access media controller 162 resides, and therefore should be accepted, or whether the payload packet data is destined to another SS and should be discarded.

The subscriber media access controller 162 also includes a transmit scheduler 168, a retransmission rule decision circuit 170, an upstream payload multiplexer 172 and a reservation request packet generator 174. The operation of the circuits 168, 170, 172 and 174 are now described with reference to FIGS. 12–13. In a first step S1, the transmission scheduler 168 performs certain initialization procedures. For instance, the transmission scheduler 168 receives from the control packets indications of available mini-slots, assigned slots and other information regarding timing. (The additional information may be a uniform system time clock maintained by the head end 112 which periodically transmits packets containing "snapshots" of the system time clock (time stamps) to the SSs 150. For example, the technique used in MPEG-2 systems for re-establishing the system time clock using program clock references or PCR's may be used to synchronize the SS clock to the head end clock. See ISO/IEC 13818-1: Generic Coding of Moving Pictures and Associated Audio, Part 1: Systems.) In a next step S2, the transmit scheduler 168 determines whether or not a pending queue (not shown) contains payload data waiting for transmission. If not, step S1 is repeated. If to-be-transmitted payload data is available, in step S3, the transmit scheduler 168 determines how much capacity is necessary to transmit the to-be-transmitted data (e.g., in terms of the number of mini-slot time periods, if slot sizes are allocated in such increments). Next, in step S4, the transmit scheduler 168 determines the next available mini-slot in which a reservation request packet may be transmitted. For example, the control packets demultiplexed from the downstream control and payload channel DCPC include a start mini-slot identification indication and an indication of the number of mini-slots, in a group of mini-slots, beginning with the identified start mini-slot that are available for new reservation request packets. The start of the mini-slot boundary can be specified by an offset counter referenced to a synchronized timing marker at the head end 112 and at each SS 150. According to one technique, the transmit scheduler 168 generates a random number and determines whether or not the random number falls within the range of 1 to the number indicated as being in the group of available mini-slots. If not, the transmit scheduler 168 refrains from transmitting reservation request packets until a control message is received from the head end 112 indicating the next available group of mini-slots.

On the other hand, if the random number falls within the range, then, in step S5, the transmit scheduler 168, at the appropriate time, provides an indication of the needed slot capacity to the reservation request packet generator 174. In response, the reservation request packet generator 174 generates a reservation request packet including the address or identifier of the SS 150, the requested slot capacity and the type of communication data to be communicated in the requested slots. The reservation request packet generator 174 is activated by the transmit scheduler 168 so as to output the reservation request packet at the specified time for transmission in the upstream control channel at the particular mini-slot, of the next group of available mini-slots, indicated by the random number generated by the transmit scheduler 168. (The actual transmission time of the request packet may be delayed from the time of the leading boundary of the corresponding mini-slot in which the reservation request packet is transmitted. The delay time may be the difference between the SS to head end propagation delay time at this particular SS 150 and the maximum SS to head end propagation delay time.) The net result is that mini-slot bursts from all SSs will arrive at the head end controller receiver tuners 258, 259 with minimum skew. Next, in step S6, the reservation request packet generator 174 then signals the retransmission rule decision circuit 170 to set its acknowledgment timer and begin counting. The retransmission rule decision circuit 170 responds by setting an appropriate timer and counting down the timer. The timer is illustratively set to expire after a time period exceeding the worst case feedback delay, equal to the round-trip propagation delay plus the processing delay at the head end 112 and SS 150, between transmitting reservation request packets and receiving acknowledgment packets in response. In step S7, the retransmission rule decision circuit 170 waits for an acknowledgment control packet to be received by the downstream payload demultiplexer 164. The retransmission rule decision circuit 170 responds to one of the following events:

(1) The timer expires (step S8). Illustratively, this indicates that the reservation request message was not received. In response, the retransmission rule decision circuit 170 causes the transmit scheduler 168 to schedule the reservation request packet generator 174 to retransmit the reservation request packet at the next available mini-slot of the upstream control channel UCC. This is achieved by step S9 which causes execution to return to step S4.

Figure 12:
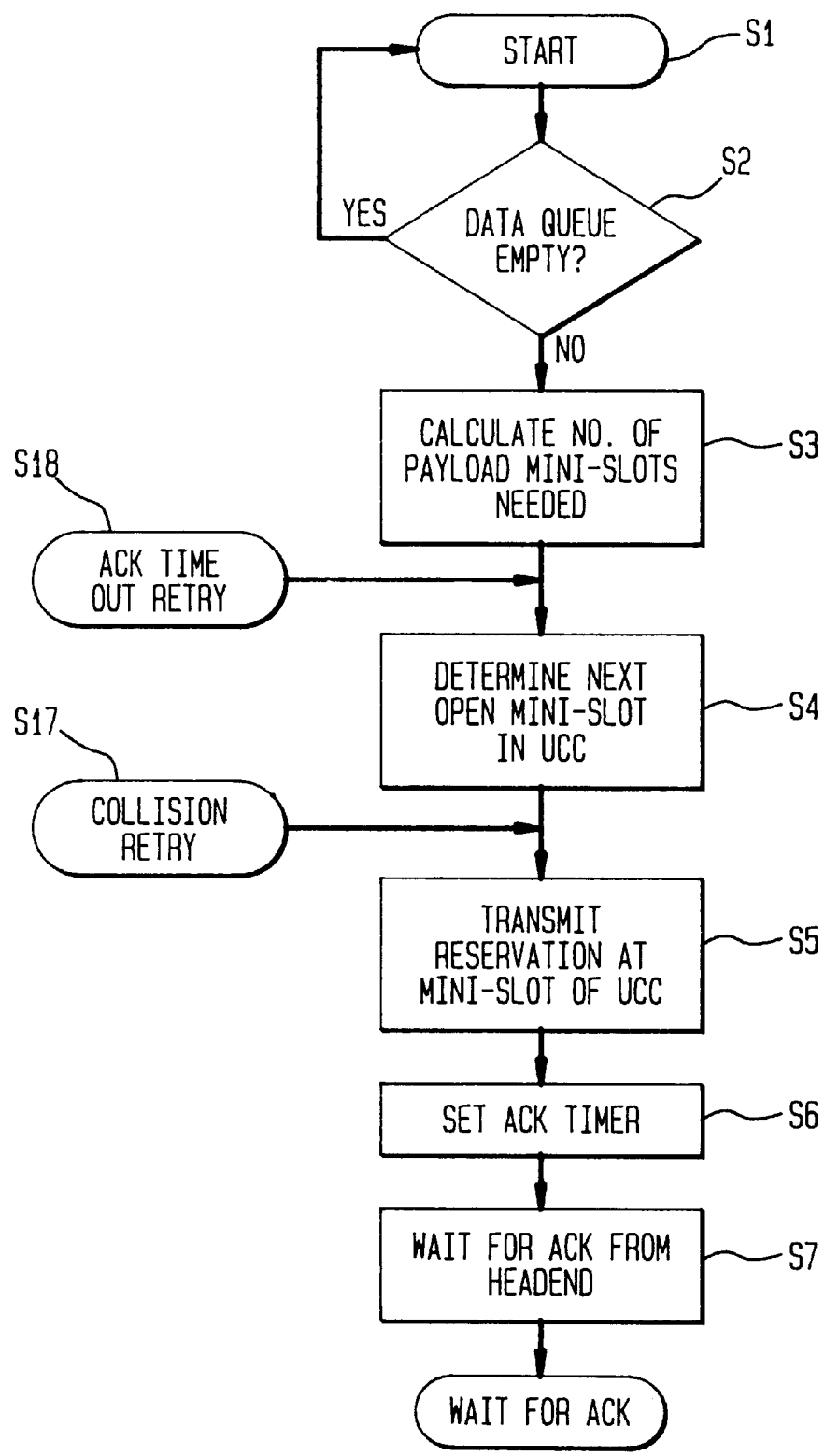
FIGS. 12–13 show a flow chart of a process executed by a subscriber station according to an embodiment of the present invention.
Figure 13:
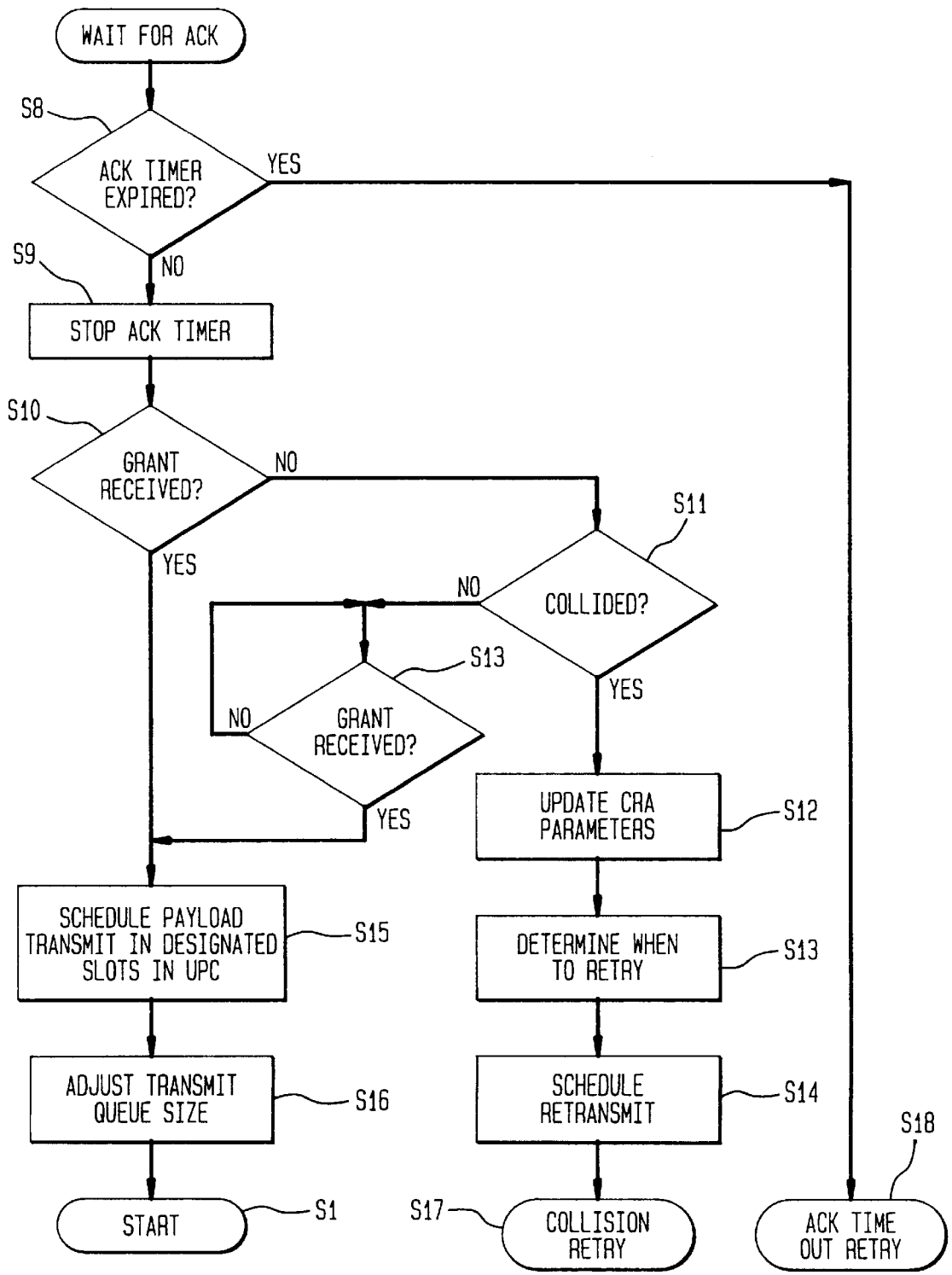

(2) Before the timer expires, a message is received from the head end 112 via the downstream control and payload channel DCPC indicating that a collision has occurred (steps S9–S11). For example, such an indication may be present in the mini-slot collision status field of a control packet received on the downstream control and payload channel DCPC (FIG. 12). In response, in step S12, the retransmission rule decision circuit 170 updates its collision resolution algorithm parameters (e.g., the persistent parameter, the next available collision resolution mini-slot, etc.) The retransmission rule decision circuit 170 furthermore determines whether or not to reattempt to transmit the reservation request packet. Assuming the retransmission rule decision circuit 170 determines to reattempt transmission, the transmission rule decision circuit 170 determines when to perform such a retransmission in step S13 and schedules the retransmission in step S14. At the appropriate time, steps S17, S5–S7 are performed whereby the transmit scheduler 168 causes the reservation request packet generator 174 to regenerate the reservation request packet and retransmit it at the next available mini-slot on the upstream control channel UCC available for collided reservation request packets. This also causes the retransmission rule decision circuit 170 to stop the timer (step S9).

(3) Before the timer expires, a message is received in a control packet transmitted from the head end 112 via the downstream control and payload channel DCPC acknowledging receipt of the reservation request packet but indicating that no slots are currently available for assignment (steps S9–S11, S13). Illustratively, this causes the retransmission rule decision circuit 170 to stop the timer (step S9) and wait for the grant control message indicating which slots are assigned to the SS 150 (step S15).

(4) Before the timer expires, a message is received in a control packet transmitted from the head end 112 via the downstream control and payload channel DCPC acknowledging receipt of the reservation request packet and assigning specific slots for transmission (steps S9, S15).

For example, such information may be present in the transmit start slot ID and number of granted slots fields of a received control packet (FIG. 11). This also causes the retransmission rule decision circuit 170 to stop the timer (step S9).

In response to receiving a grant control packet that assigns one or more slots to the SS 150, the transmit scheduler 168 schedules the pending to-be-transmitted data residing in the queue for transmission in step S15. At the appropriate time, the data is segmented into packets by the upstream payload multiplexer 172 and outputted to the encoder, interleaver, forward error corrector and modulator circuit 176, under control of the transmit scheduler 168. The transmit scheduler uses the internal system clock, the start slot indication and number of granted slot indications received in control packets by the downstream control demultiplexer 166 to properly synchronize the segmentation and modulation of packet data with the assigned slot(s). (Again, the actual transmission may be delayed from the leading slot boundary by a particular delay equal to the difference between the head end 112 to SS 150 propagation delay for this SS 150 and the maximum head end 112 to SS propagation delay.) Afterwards, in step S 16, an accounting is made of the remaining to-be-transmitted data in the queue and processing returns to step S1.

Figure 14:
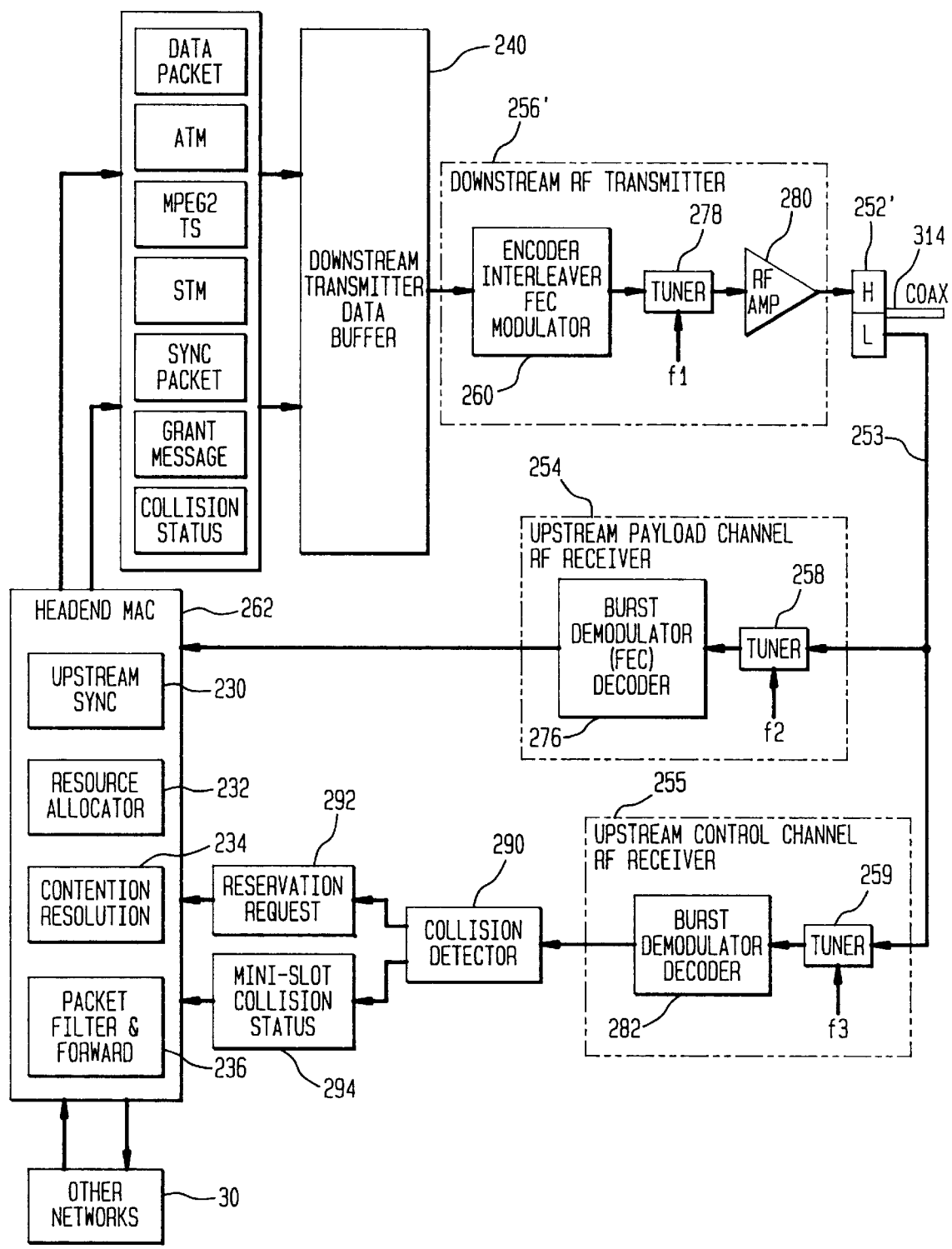
FIG. 14 shows circuitry in a head end according to an embodiment of the present invention.

Referring now to FIG. 14, a circuit for adapting a head end controller of a head end 112 is shown. The head end 112 has a downstream RF transmitter 256, an upstream payload channel RF receiver 254 and an upstream control channel RF receiver 255. The downstream RF transmitter 256 receives packets at an encoder, interleaver, forward error corrector and modulator circuit 260. This circuit 260, amongst other things, modulates packets onto a carrier signal for transmission. The modulated carrier signal is outputted to a frequency agile tuner 278 which also receives an indication of the carrier or center frequency f1. The frequency agile tuner 278 shifts the modulated carrier signal to the downstream control and payload channel DCPC band. The RF amplifier 280 amplifies the signal and outputs the amplified signal to diplexer 252. Diplexer 252 combines the downstream control and payload channel signal thus generated with the other signals carried on coaxial link 34.

The diplexer 252 also splits off the upstream directed signals 253 from the signals carried on the coaxial link 34. The upstream payload channel RF receiver 254 has a frequency agile tuner 258 that receives the upstream directed signals, an indication of the carrier or center frequency f2 and an indication of the bandwidth of the upstream payload channel UPC. As such, the frequency agile tuner 258 filters out the upstream payload channel UPC signal. The filtered out upstream payload UPC channel signal is inputted to a burst demodulator, forward error corrector and decoder circuit 276. Amongst other things, the circuit 276 demodulates and receives each payload packet from the upstream payload channel UPC and outputs each payload packet to the head end media access controller 262.

Likewise, the upstream control channel RF receiver 255 has a frequency agile tuner 259 that receives the upstream directed signals outputted from the diplexer 252, an indication of the carrier or center frequency f3 and an indication of the bandwidth of the upstream control channel UCC. As such, the frequency agile tuner 259 filters out the upstream control channel UCC signal. The filtered-out signal is inputted to a burst demodulator and decoder circuit 282. Amongst other things, the circuit 282 demodulates each control packet from the upstream control channel UCC and outputs each control packet to the collision detector 290. As shown, the collision detector 290 is connected to a reservation request register 292 and a mini-slot collision status queue 294. In response to detecting a collision, collision status information is inputted to the collision status register 294. In response to receiving a reservation request packet, information regarding the reservation request, e.g., the address of the requesting SS, the amount of requested slot capacity, etc., is stored in the reservation request register 292.

The head end media access controller 262 is shown as including an upstream synchronizer 230, a resource allocator 232, a contention resolution circuit 234 and a packet filter and forward circuit 236. While shown as separate circuits, the head end media access controller 262 can also be implemented with a suitably programmed processor.

The purpose of the packet filter and forward circuit 236 is to receive payload packets from within the cable network and from other networks 230 and to forward such packets to the correct destination. Packets destined outside of the cable network are transmitted to one of the other attached networks 30. Packets destined to a SS 150 are enqueued in downstream transmitted data buffer 240 for transmission on the payload bitstreams of downstream control and payload channel DCPC.

The purpose of the upstream synchronizer 230 is to maintain a system clock and to periodically broadcast time stamps of the system clock to the SSs 150 so that all station system clocks and the head end system clock are synchronized. Once synchronized, station MACs 162 will know the precise mini-slot location by referencing the offset value to the time-stamp value broadcasted down the DCPC. The upstream synchronizer 230 also synchronizes the transmission of packets on the downstream control and payload channel DCPC. In addition, several different kinds of packets may be available for transmission in the downstream transmitter data buffer 240 which may be stored in separate queues. The upstream synchronizer 230 judiciously selects from amongst the different types of enqueued packets depending on their type and their respective urgency for output from the downstream transmitter data buffer 240. As noted above, the packets transmitted on the downstream control and payload channel DCPC may be MPEG-2 transport stream packets containing specific PIDs, control packets and payload packets. The upstream synchronizer 230 segments enqueued packets and reassembles them into MPEG-2 transport stream packets as necessary. However, this is only illustrative; other multiplexing and encoding schemes can be used.

The purpose of the resource allocator 232 is to keep track of resources and allocate them in a fair and orderly manner or according to the priority of each communication for which resources are allocated. Most notably, the resource allocator 232 keeps track of allocated slots on the upstream payload channel UPC and ensures that each slot is allocated only to a single SS 150. The allocation technique employed by the resource allocator 232 can be quite intricate wherein slots are allocated on a prioritized basis depending on the type of communication for which each SS 150 has requested to reserve slots.

The purpose of the contention resolution circuit 234 is to generate a control packet message when a collision occurs. The contention resolution circuit 234 may also maintain statistics on the number of collisions, which statistics may in turn be used to control when to broadcast a start available mini-slot for new reservation requests or how many mini-slots to make available in a group of mini-slots for new reservation requests. The contention resolution circuit 234 therefore controls how many residual mini-slots are available for retransmitting collided reservation request packets.

Figure 15:
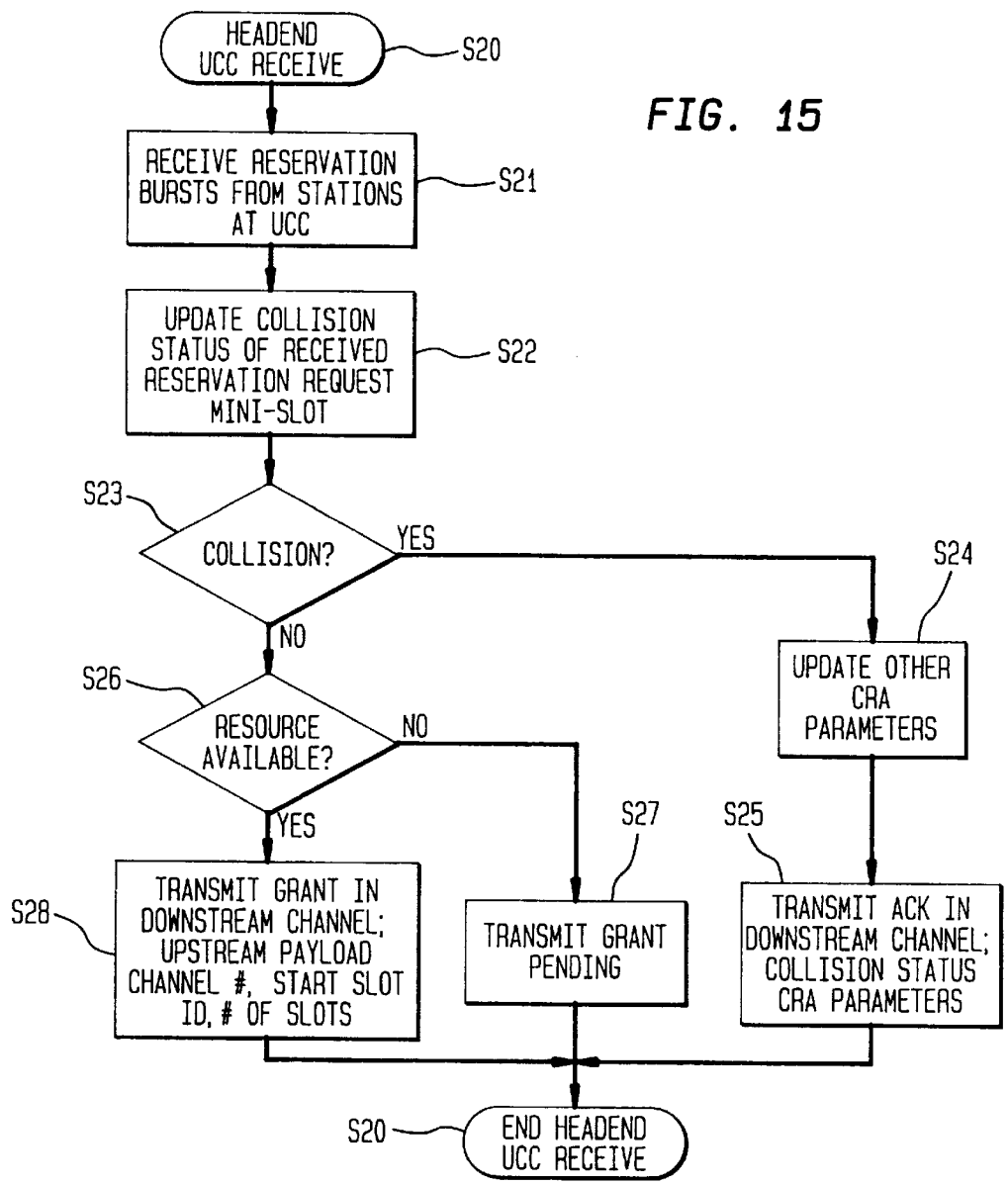
FIG. 15 shows a flow chart of a process executed by a head end according to an embodiment of the present invention.

The slot allocation operation of the head end circuitry 112 will now be described with reference to FIG. 15. In step S20, the upstream control channel RF receiver 255 receives a modulated signal from the upstream control channel and demodulates a reservation request control packet therefrom. In step S21, the collision detection circuit 290 receives a reservation request packet from the upstream control channel RF receiver 255. Next, the collision detector determines whether or not a collision has occurred, e.g., by performing an error check on the received reservation request packet. In step S22, the collision detection circuit 290 updates the collision status register to indicate whether or not a collision has occurred. In step S23, if a collision has occurred, then in step S24, the contention resolution circuit 234 updates various contention resolution parameters (e.g., number of collisions, etc.). The contention resolution circuit 234 furthermore enqueues a collision detected control packet into the downstream transmitter data buffer 240. In step S25, the collision detected control packet is outputted to the downstream RF transmitter 256 for transmission at the appropriate time slot of the downstream control and payload channel DCPC under the control of the upstream synchronizer 230. Processing then returns to step S20.

In step S23, if no collision has occurred then the resource allocator 232 determines whether or not sufficient resources (e.g., slots of the upstream payload channel UPC) are available for allocating slots to the requesting SS 150 (step S26). If not, then in step S27 the resource allocator 234 notes the request as pending and generates a grant pending acknowledgment control packet which is enqueued in the downstream transmitter data buffer 240. The grant pending acknowledgment control packet is outputted to the downstream RF transmitter 256 for transmission at the appropriate time slot of the downstream control and payload channel DCPC under the control of the upstream synchronizer 230. Processing then returns to step S20.

If in step S26, the resource allocator 234 determines that sufficient resources are available for satisfying the reservation request, then processing proceeds to step S28. In step S28, the resource allocator 234 assigns resources, i.e., slots, to the SS 150 that transmitted the reservation request. The resource allocator 234 then generates a slot assignment acknowledgment control packet indicating the slots which were assigned to the requesting SS 150. As noted above, such a packet includes the identifier or address of the requesting SS 150, the identifier of the starting slot in the upstream payload channel UPC assigned to the requesting SS 150 and the slot capacity (e.g., measured by the number of mini-slot lengths of the assigned slot) assigned to the SS 150. The resource allocator 234 enqueues the slot assignment acknowledgment control packet thus generated in the downstream transmitter data buffer 240. The slot assignment acknowledgment control packet is outputted to the downstream RF transmitter 256 for transmission at the appropriate time slot of the downstream control and payload channel DCPC under the control of the upstream synchronizer 230. Processing then returns to step S20.

Figure 16:
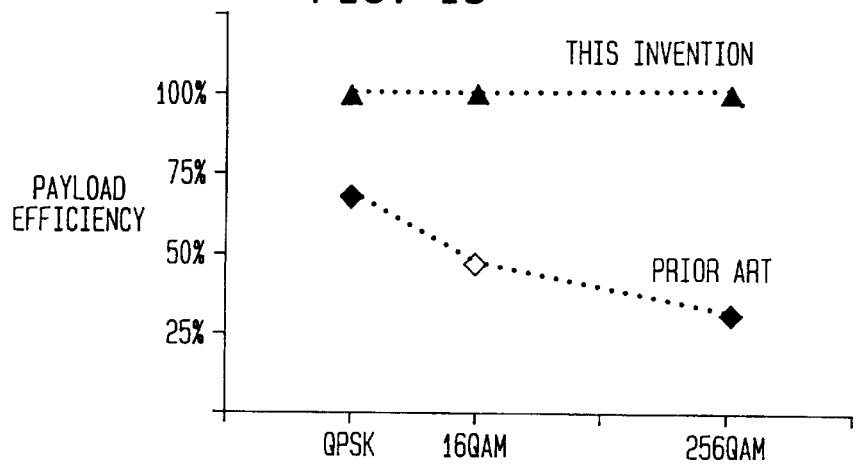
FIG. 16 shows a graph comparing payload efficiency of the present invention to the prior art.

FIG. 16 shows a graph of payload efficiency for the present invention and the prior art. As shown, as higher order QAM techniques are used, a larger fraction of the communication bandwidth is allocated for mini-slots in the prior art. In contrast, according to the invention, all of the bandwidth in the upstream payload channel UPC is allocated for payload packets. Thus, no reduction in bandwidth occurs as higher order QAM techniques are employed. Other advantages achieved by the invention include:

(1) Because the upstream control and payload bitstreams are separated into different channels, each channel can be individually optimized for the best mode of operation. For example, the upstream control channel, requiring relatively low bit rate and short mini-slot bursts, is best served by a robust modulation scheme with relatively narrow bandwidth that can be fit into the available narrow "gap" in the upstream spectrum with ingress noise. This preserves the wider available low noise bandwidth spectrum for upstream payload channels, which requires optimization for the highest efficiency with longer payload bursts.

(2) Note also that it is easier to increase the payload capacity by simply adding upstream payload channels. The head end does not need equipment for such added upstream payload channels that can distinguish control information (i.e., mini-slot boundaries and contents) from payload information (i.e., slot boundaries and contents) for such added channels as in the conventional system.

Similar reasoning applies to adding additional upstream control channels to accommodate additional subscriber stations. Thus, the inventive system is easier to expand.

(3) No complex system reconfiguration algorithm for repeatedly time dividing each upstream channel into both slots and mini-slots is needed. Thus, system robustness increases. This results, because subscriber stations need not periodically reconfigure the time division of the upstream channels to optimize channel utilization. Frequent reconfigurations will increase the probabilities of erroneous configuration of each subscriber station. Because such reconfigurations are not performed, the likelihood of erroneous reconfiguration by a subscriber station is decreased. In addition, less overhead in the downstream control and payload channel will be achieved because there is no need for frequent sending of reconfiguration messages down to the stations.

(4) The modulation technique for each of the upstream control and payload channels may be independently selected to optimize the robustness or information carrying capacity of that channel, simplifying the introduction of advanced modulation technologies.

As noted above, the implementation of the invention in a cable network was merely illustrative. The invention may for instance be employed in a wireless network. In this case, the central controller is a base station, the subscriber stations are communication units such as cordless or cellular telephones or terminals and the shared medium is the air. The transmitters and receivers of the central controller and the communication units interface to the shared medium using radio antennae. Note that the subscriber stations may be stationary or mobile within the coverage area of the base station.

In another embodiment, the invention is employed in a satellite communication system. The central controller is a satellite, e.g., in geosynchronous orbit, the subscriber stations are earth stations and the shared medium is the air and space. The satellite includes a transponder and on-board controller. The transmitters and receivers of the earth stations and the transponder of the satellite interface with the shared medium using antennae.

As further noted above, different modulation techniques may be employed to achieve the upstream control and upstream payload channels that can simultaneously carry information. Some modulation schemes are single carrier modulation schemes such as QPSK and n-QAM. Other modulation schemes utilize multiple carriers, such as DMT, DWMT and OFDM. According to one technique, the upstream control and payload channels are defined using FDM and SCDMA. According to such a definition, each channel is defined by one or more "orthogonal" code sequences. The sequences assigned to all of the channels are then modulated onto a single carrier across the bandwidth of the entire FDM channel.

The above discussion is intended to be illustrative of the invention. Those having ordinary skill in the art may devise numerous alternative variations of the invention without departing from the spirit and scope of the following claims.

The claimed invention is:

1. A network comprising:

a centralized controller, a station connected to said centralized controller over a shared medium, a first distinct shared unidirectional transmission path being established between said centralized controller and said station for transmitting data from said centralized controller to said station, wherein the first path being a downstream channel, and at least a second and third distinct shared unidirectional transmission paths being established between said centralized controller and said station for transmitting data from said station to said centralized controller, wherein the second and third paths each being an upstream channel, wherein said station transmitting reservation requests data on said second path and receiving a payload data transmission grant from said centralized controller on said first path to transmit payload data on said third path from said station to said centralized controller on time-slots allocated by said centralized controller, and wherein said centralized controller receiving said reservation request data on said second path from said station and transmitting on said first path a payload data transmission grant to said station for transmitting payload data on said third path on said time-slots allocated by said centralized controller and wherein each of said transmission paths comprises a channel having a unique carrier frequency and bandwidth, and a modulation scheme.

2. The network of claim 1 wherein said network is a two-way hybrid fiber-coax (HFC) cable-TV network, wherein said shared medium comprises fiber-optic and coaxial cables, wherein said centralized controller is a headend controller, and wherein said station is one of a subscriber station, settop box, cable modem, and customer premise equipment.

3. The network of claim 1 wherein said network is a fiber-optic network, and wherein said shared medium is an optical fiber.

4. The network of claim 1 wherein said network comprises three shared unidirectional paths.

5. The network of claim 1 wherein said first path on which payload and control data packets are transmitted is one of plural downstream channels.

6. A network comprising:

a centralized controller, a station connected to said centralized controller over a shared medium, a first distinct shared unidirectional transmission path being established between said centralized controller and said station for transmitting data from said centralized controller to said station, wherein the first path being a downstream channel, and at least a second and third distinct shared unidirectional transmission paths being established between said centralized controller and said station for transmitting data from said station to said centralized controller, wherein the second and third paths each being an upstream channel, wherein said station transmitting reservation requests data on said second path and receiving a payload data transmission grant from said centralized controller on said first path to transmit payload data on said third path from said station to said centralized controller on time-slots allocated by said centralized controller, wherein said centralized controller receiving said reservation request data on said second path from said station and transmitting on said first path a payload data transmission grant to said station for transmitting payload data on said third path on said time-slots allocated by said centralized controller, and wherein transmissions over said second and third paths are carried out simultaneously during overlapping time periods in said station.

7. A network comprising:

a centralized controller, a station connected to said centralized controller over a shared medium, a first distinct shared unidirectional transmission path being established between said centralized controller and said station for transmitting data from said centralized controller to said station, wherein the first path being a downstream channel, and at least a second and third distinct shared unidirectional transmission paths being established between said centralized controller and said station for transmitting data from said station to said centralized controller, wherein the second and third paths each being an upstream channel, wherein said station transmitting reservation requests data on said second path and receiving a payload data transmission grant from said centralized controller on said first path to transmit payload data on said third path from said station to said centralized controller on time-slots allocated by said centralized controller, wherein said centralized controller receiving said reservation request data on said second path from said station and transmitting on said first path a payload data transmission grant to said station for transmitting payload data on said third path on said time-slots allocated by said centralized controller, and wherein said network is a wireless network, wherein said shared medium is air, wherein said centralized controller is a base-station, and wherein said station is one of a mobile and stationary communication unit.

8. A network comprising:

a centralized controller, a station connected to said centralized controller over a shared medium, a first distinct shared unidirectional transmission path being established between said centralized controller and said station for transmitting data from said centralized controller to said station, wherein the first path being a downstream channel, and at least a second and third distinct shared unidirectional transmission paths being established between said centralized controller and said station for transmitting data from said station to said centralized controller, wherein the second and third paths each being an upstream channel, wherein said station transmitting reservation requests data on said second path and receiving a payload data transmission grant from said centralized controller on said first path to transmit payload data on said third path from said station to said centralized controller on time-slots allocated by said centralized controller, wherein said centralized controller receiving said reservation request data on said second path from said station and transmitting on said first path a payload data transmission grant to said station for transmitting payload data on said third path on said time-slots allocated by said centralized controller, and wherein said network is a satellite network, wherein said shared medium is air and space, wherein said centralized controller is a transponder, and wherein said station is one of an earth station and a mobile communication unit.

9. A network comprising:

a centralized controller, a station connected to said centralized controller over a shared medium, a first distinct shared unidirectional transmission path being established between said centralized controller and said station for transmitting data from said centralized controller to said station, wherein the first path being a downstream channel, and at least a second and third distinct shared unidirectional transmission paths being established between said centralized controller and said station for transmitting data from said station to said centralized controller, wherein the second and third paths each being an upstream channel, wherein said station transmitting reservation requests data on said second path and receiving a payload data transmission grant from said centralized controller on said first path to transmit payload data on said third path from said station to said centralized controller on time-slots allocated by said centralized controller, wherein said centralized controller receiving said reservation request data on said second path from said station and transmitting on said first path a payload data transmission grant to said station for transmitting payload data on said third path on said time-slots allocated by said centralized controller, and wherein each of said second and third transmission paths comprises a channel having a unique set of orthogonal codes and symbols in a S-CDMA modulation scheme.

10. A network comprising:

a centralized controller, a station connected to said centralized controller over a shared medium, a first distinct shared unidirectional transmission path being established between said centralized controller and said station for transmitting data from said centralized controller to said station, wherein the first path being a downstream channel, and at least a second and third distinct shared unidirectional transmission paths being established between said centralized controller and said station for transmitting data from said station to said centralized controller, wherein the second and third paths each being an upstream channel, wherein said station transmitting reservation requests data on said second path and receiving a payload data transmission grant from said centralized controller on said first path to transmit payload data on said third path from said station to said centralized controller on time-slots allocated by said centralized controller, wherein said centralized controller receiving said reservation request data on said second path from said station and transmitting on said first path a payload data transmission grant to said station for transmitting payload data on said third path on said time-slots allocated by said centralized controller, and wherein each of said transmission paths comprises a channel having a unique set of orthogonal tones and symbols in an OFDM or Multi-Tone modulation scheme.

11. A network comprising:

a centralized controller, a station connected to said centralized controller over a shared medium, a first distinct shared unidirectional transmission path being established between said centralized controller and said station for transmitting data from said centralized controller to said station, wherein the first path being a downstream channel, and at least a second and third distinct shared unidirectional transmission paths being established between said centralized controller and said station for transmitting data from said station to said centralized controller, wherein the second and third paths each being an upstream channel, wherein said station transmitting reservation requests data on said second path and receiving a payload data transmission grant from said centralized controller on said first path to transmit payload data on said third path from said station to said centralized controller on time-slots allocated by said centralized controller, wherein said centralized controller receiving said reservation request data on said second path from said station and transmitting on said first path a payload data transmission grant to said station for transmitting payload data on said third path on said time-slots allocated by said centralized controller, and wherein said first path is a broadcasting downstream channel carrying MPEG2 transport packets.

12. A network comprising:

a centralized controller, a station connected to said centralized controller over a shared medium, a first distinct shared unidirectional transmission path being established between said centralized controller and said station for transmitting data from said centralized controller to said station, wherein the first path being a downstream channel, and at least a second and third distinct shared unidirectional transmission paths being established between said centralized controller and said station for transmitting data from said station to said centralized controller, wherein the second and third paths each being an upstream channel, wherein said station transmitting reservation requests data on said second path and receiving a payload data transmission grant from said centralized controller on said first path to transmit payload data on said third path from said station to said centralized controller on time-slots allocated by said centralized controller, wherein said centralized controller receiving said reservation request data on said second path from said station and transmitting on said first path a payload data transmission grant to said station for transmitting payload data on said third path on said time-slots allocated by said centralized controller, and wherein first and second modulation techniques are used for said second path and third path, respectively, wherein said second path being an upstream control channel (UCC) and said third path being an upstream payload channel (UPC), and wherein said first modulation technique enhances robustness and efficiency of said reservation request packet transmission of said UCC without degrading the robustness, efficiency and utilization of said UPC.

13. A network comprising:

a centralized controller, a station connected to said centralized controller over a shared medium, a first distinct shared unidirectional transmission path being established between said centralized controller and said station for transmitting data from said centralized controller to said station, wherein the first path being a downstream channel, and at least a second and third distinct shared unidirectional transmission paths being established between said centralized controller and said station for transmitting data from said station to said centralized controller, wherein the second and third paths each being an upstream channel, wherein said station transmitting reservation requests data on said second path and receiving a payload data transmission grant from said centralized controller on said first path to transmit payload data on said third path from said station to said centralized controller on time-slots allocated by said centralized controller, wherein said centralized controller receiving said reservation request data on said second path from said station and transmitting on said first path a payload data transmission grant to said station for transmitting payload data on said third path on said time-slots allocated by said centralized controller, and wherein said second path on which reservation request packets are transmitted is one of a plurality of upstream control channels.

14. A network comprising:

a centralized controller, a station connected to said centralized controller over a shared medium, a first distinct shared unidirectional transmission path being established between said centralized controller and said station for transmitting data from said centralized controller to said station, wherein the first path being a downstream channel, and at least a second and third distinct shared unidirectional transmission paths being established between said centralized controller and said station for transmitting data from said station to said centralized controller, wherein the second and third paths each being an upstream channel, wherein said station transmitting reservation requests data on said second path and receiving a payload data transmission grant from said centralized controller on said first path to transmit payload data on said third path from said station to said centralized controller on time-slots allocated by said centralized controller, wherein said centralized controller receiving said reservation request data on said second path from said station and transmitting on said first path a payload data transmission grant to said station for transmitting payload data on said third path on said time-slots allocated by said centralized controller, and wherein said third path on which reservation request packets are transmitted is one of a plurality of upstream payload channels.

15. A multiple access method via a shared medium of a network, said network comprising a centralized controller and a plurality of stations connected to said centralized controller over a shared medium, wherein a first distinct shared unidirectional transmission path is established between said centralized controller and said stations for broadcasting data from said centralized controller to said stations, at least second and third distinct shared unidirectional transmission paths for transmitting data from said stations to said centralized controller, wherein the first path being a downstream channel and said second and third paths each being an upstream channel, said multiple access method comprising the steps of:

transmitting from a particular station reservation request data on said second path and receiving a payload data transmission grant message from said centralized controller on said first path to transmit payload data packets on said third path from said particular station to said centralized controller on payload time-slots allocated by said centralized controller, transmitting from said particular station said reservation request data on said second path if said particular station fails to receive a grant message from said centralized controller within a predetermined time delay or if said particular station receives a collision status message from said centralized controller on said first path to retransmit said reservation request according to a collision resolution algorithm, receiving by said centralized controller said reservation request data on said second path from said particular station, and transmitting on said first path said payload data transmission grant data to said particular station for transmission on said third path of payload data on said payload time-slots allocated by said centralized controller, and optionally detecting by said centralized controller a collision due to simultaneous transmission of said reservation requests by two or more stations on the same reservation time-slot of said second path, and then transmitting said collision statuses of said reservation requests on said first path to said stations, which will retransmit their reservation requests according to said collision resolution algorithm, wherein each of said transmission paths comprises a channel having a unique carrier frequency and bandwidth, and a modulation scheme.

16. The method of claim 15 wherein said network is a two-way hybrid fiber-coax (HFC) cable-TV network, wherein said shared medium comprises fiber-optic and coaxial cables, wherein said centralized controller is a headend controller, and wherein said station is one of a subscriber station, settop box, cable modem, and customer premise equipment.

17. The method of claim 15 wherein said network is a fiber-optic network, and wherein said shared medium is an optical fiber.

18. The method of claim 15 wherein said network comprises three shared unidirectional paths.

19. The method of claim 15 wherein said first path on which payload and control data packets are transmitted is one of plural downstream channels.

20. A multiple access method via a shared medium of a network, said network comprising a centralized controller and a plurality of stations connected to said centralized controller over a shared medium, wherein a first distinct shared unidirectional transmission path is established between said centralized controller and said stations for broadcasting data from said centralized controller to said stations, at least second and third distinct shared unidirectional transmission paths for transmitting data from said stations to said centralized controller, wherein the first path being a downstream channel and said second and third paths each being an upstream channel, said multiple access method comprising the steps of:

transmitting from a particular station reservation request data on said second path and receiving a payload data transmission grant message from said centralized controller on said first path to transmit payload data packets on said third path from said particular station to said centralized controller on payload time-slots allocated by said centralized controller, transmitting from said particular station said reservation request data on said second path if said particular station fails to receive a grant message from said centralized controller within a predetermined time delay or if said particular station receives a collision status message from said centralized controller on said first path to retransmit said reservation request according to a collision resolution algorithm, receiving by said centralized controller said reservation request data on said second path from said particular station, and transmitting on said first path said payload data transmission grant data to said particular station for transmission on said third path of payload data on said payload time-slots allocated by said centralized controller, and optionally detecting by said centralized controller a collision due to simultaneous transmission of said reservation requests by two or more stations on the same reservation time-slot of said second path, and then transmitting said collision statuses of said reservation requests on said first path to said stations, which will retransmit their reservation requests according to said collision resolution algorithm, wherein transmissions over said second and third paths are carried out simultaneously during overlapping time periods in said particular station.

21. A multiple access method via a shared medium of a network, said network comprising a centralized controller and a plurality of stations connected to said centralized controller over a shared medium, wherein a first distinct shared unidirectional transmission path is established between said centralized controller and said stations for broadcasting data from said centralized controller to said stations, at least second and third distinct shared unidirectional transmission paths for transmitting data from said stations to said centralized controller, wherein the first path being a downstream channel and said second and third paths each being an upstream channel, said multiple access method comprising the steps of:

transmitting from a particular station reservation request data on said second path and receiving a payload data transmission grant message from said centralized controller on said first path to transmit payload data packets on said third path from said particular station to said centralized controller on payload time-slots allocated by said centralized controller, transmitting from said particular station said reservation request data on said second path if said particular station fails to receive a grant message from said centralized controller within a predetermined time delay or if said particular station receives a collision status message from said centralized controller on said first path to retransmit said reservation request according to a collision resolution algorithm, receiving by said centralized controller said reservation request data on said second path from said particular station, and transmitting on said first path said payload data transmission grant data to said particular station for transmission on said third path of payload data on said payload time-slots allocated by said centralized controller, and optionally detecting by said centralized controller a collision due to simultaneous transmission of said reservation requests by two or more stations on the same reservation time-slot of said second path, and then transmitting said collision statuses of said reservation requests on said first path to said stations, which will retransmit their reservation requests according to said collision resolution algorithm, wherein said network is a wireless network, wherein said shared medium is air, wherein said centralized controller is a base-station, and wherein said station is one of a mobile and stationary communication unit.

22. A multiple access method via a shared medium of a network, said network comprising a centralized controller and a plurality of stations connected to said centralized controller over a shared medium, wherein a first distinct shared unidirectional transmission path is established between said centralized controller and said stations for broadcasting data from said centralized controller to said stations, at least second and third distinct shared unidirectional transmission paths for transmitting data from said stations to said centralized controller, wherein the first path being a downstream channel and said second and third paths each being an upstream channel, said multiple access method comprising the steps of:

transmitting from a particular station reservation request data on said second path and receiving a payload data transmission grant message from said centralized controller on said first path to transmit payload data packets on said third path from said particular station to said centralized controller on payload time-slots allocated by said centralized controller, transmitting from said particular station said reservation request data on said second path if said particular station fails to receive a grant message from said centralized controller within a predetermined time delay or if said particular station receives a collision status message from said centralized controller on said first path to retransmit said reservation request according to a collision resolution algorithm, receiving by said centralized controller said reservation request data on said second path from said particular station, and transmitting on said first path said payload data transmission grant data to said particular station for transmission on said third path of payload data on said payload time-slots allocated by said centralized controller, and optionally detecting by said centralized controller a collision due to simultaneous transmission of said reservation requests by two or more stations on the same reservation time-slot of said second path, and then transmitting said collision statuses of said reservation requests on said first path to said stations, which will retransmit their reservation requests according to said collision resolution algorithm, wherein said network is a satellite network, wherein said shared medium is air and space, wherein said centralized controller is a transponder, and wherein said station is one of an earth station and a mobile communication unit.

23. A multiple access method via a shared medium of a network, said network comprising a centralized controller and a plurality of stations connected to said centralized controller over a shared medium, wherein a first distinct shared unidirectional transmission path is established between said centralized controller and said stations for broadcasting data from said centralized controller to said stations, at least second and third distinct shared unidirectional transmission paths for transmitting data from said stations to said centralized controller, wherein the first path being a downstream channel and said second and third paths each being an upstream channel, said multiple access method comprising the steps of:

transmitting from a particular station reservation request data on said second path and receiving a payload data transmission grant message from said centralized controller on said first path to transmit payload data packets on said third path from said particular station to said centralized controller on payload time-slots allocated by said centralized controller, transmitting from said particular station said reservation request data on said second path if said particular station fails to receive a grant message from said centralized controller within a predetermined time delay or if said particular station receives a collision status message from said centralized controller on said first path to retransmit said reservation request according to a collision resolution algorithm, receiving by said centralized controller said reservation request data on said second path from said particular station, and transmitting on said first path said payload data transmission grant data to said particular station for transmission on said third path of payload data on said payload time-slots allocated by said centralized controller, and optionally detecting by said centralized controller a collision due to simultaneous transmission of said reservation requests by two or more stations on the same reservation time-slot of said second path, and then transmitting said collision statuses of said reservation requests on said first path to said stations, which will retransmit their reservation requests according to said collision resolution algorithm, wherein each of said second and third transmission paths comprises a channel having a unique set of orthogonal codes and symbols in a S-CDMA modulation scheme.

24. A multiple access method via a shared medium of a network, said network comprising a centralized controller and a plurality of stations connected to said centralized controller over a shared medium, wherein a first distinct shared unidirectional transmission path is established between said centralized controller and said stations for broadcasting data from said centralized controller to said stations, at least second and third distinct shared unidirectional transmission paths for transmitting data from said stations to said centralized controller, wherein the first path being a downstream channel and said second and third paths each being an upstream channel, said multiple access method comprising the steps of:

transmitting from a particular station reservation request data on said second path and receiving a payload data transmission grant message from said centralized controller on said first path to transmit payload data packets on said third path from said particular station to said centralized controller on payload time-slots allocated by said centralized controller, transmitting from said particular station said reservation request data on said second path if said particular station fails to receive a grant message from said centralized controller within a predetermined time delay or if said particular station receives a collision status message from said centralized controller on said first path to retransmit said reservation request according to a collision resolution algorithm, receiving by said centralized controller said reservation request data on said second path from said particular station, and transmitting on said first path said payload data transmission grant data to said particular station for transmission on said third path of payload data on said payload time-slots allocated by said centralized controller, and optionally detecting by said centralized controller a collision due to simultaneous transmission of said reservation requests by two or more stations on the same reservation time-slot of said second path, and then transmitting said collision statuses of said reservation requests on said first path to said stations, which will retransmit their reservation requests according to said collision resolution algorithm, wherein each of said transmission paths comprises a channel having a unique set of orthogonal tones and symbols in an OFDM or Multi-Tone modulation scheme.

25. A multiple access method via a shared medium of a network, said network comprising a centralized controller and a plurality of stations connected to said centralized controller over a shared medium, wherein a first distinct shared unidirectional transmission path is established between said centralized controller and said stations for broadcasting data from said centralized controller to said stations, at least second and third distinct shared unidirectional transmission paths for transmitting data from stations to said centralized controller, wherein the first path being a downstream channel and said second and third paths each being an upstream channel, said multiple access method comprising the steps of:

transmitting from a particular station reservation request data on said second path and receiving a payload data transmission grant message from said centralized controller on said first path to transmit payload data packets on said third path from said particular station to said centralized controller on payload time-slots allocated by said centralized controller, transmitting from said particular station said reservation request data on said second path if said particular station fails to receive a grant message from said centralized controller within a predetermined time delay or if said particular station receives a collision status message from said centralized controller on said first path to retransmit said reservation request according to a collision resolution algorithm, receiving by said centralized controller said reservation request data on said second path from said particular station, and transmitting on said first path said payload data transmission grant data to said particular station for transmission on said third path of payload data on said payload time-slots allocated by said centralized controller, and optionally detecting by said centralized controller a collision due to simultaneous transmission of said reservation requests by two or more stations on the same reservation time-slot of said second path, and then transmitting said collision statuses of said reservation requests on said first path to said stations, which will retransmit their reservation requests according to said collision resolution algorithm, wherein said first path is a broadcasting downstream channel carrying MPEG2 transport packets.

26. A multiple access method via a shared medium of a network, said network comprising a centralized controller and a plurality of stations connected to said centralized controller over a shared medium, wherein a first distinct shared unidirectional transmission path is established between said centralized controller and said stations for broadcasting data from said centralized controller to said stations, at least second and third distinct shared unidirectional transmission paths for transmitting data from stations to said centralized controller, wherein the first path being a downstream channel and said second and third paths each being an upstream channel, said multiple access method comprising the steps of:

transmitting from a particular station reservation request data on said second path and receiving a payload data transmission grant message from said centralized controller on said first path to transmit payload data packets on said third path from said particular station to said centralized controller on payload time-slots allocated by said centralized controller, transmitting from said particular station said reservation request data on said second path if said particular station fails to receive a grant message from said centralized controller within a predetermined time delay or if said particular station receives a collision status message from said centralized controller on said first path to retransmit said reservation request according to a collision resolution algorithm, receiving by said centralized controller said reservation request data on said second path from said particular station, and transmitting on said first path said payload data transmission grant data to said particular station for transmission on said third path of payload data on said payload time-slots allocated by said centralized controller, and optionally detecting by said centralized controller a collision due to simultaneous transmission of said reservation requests by two or more stations on the same reservation time-slot of said second path, and then transmitting said collision statuses of said reservation requests on said first path to said stations, which will retransmit their reservation requests according to said collision resolution algorithm, wherein first and second modulation techniques are used for said second path and third path, respectively, wherein said second path being an upstream control channel (UCC) and said third path being an upstream payload channel (UPC), and wherein said first modulation technique enhances robustness and efficiency of said reservation request packet transmission of said UCC without degrading the robustness, efficiency and utilization of said UPC.

27. A multiple access method via a shared medium of a network, said network comprising a centralized controller and a plurality of stations connected to said centralized controller over a shared medium, wherein a first distinct shared unidirectional transmission path is established between said centralized controller and said stations for broadcasting data from said centralized controller to said stations, at least second and third distinct shared unidirectional transmission paths for transmitting data from said stations to said centralized controller, wherein the first path being a downstream channel and said second and third paths each being an upstream channel, said multiple access method comprising the steps of:

transmitting from a particular station reservation request data on said second path and receiving a payload data transmission grant message from said centralized controller on said first path to transmit payload data packets on said third path from said particular station to said centralized controller on payload time-slots allocated by said centralized controller, transmitting from said particular station said reservation request data on said second path if said particular station fails to receive a grant message from said centralized controller within a predetermined time delay or if said particular station receives a collision status message from said centralized controller on said first path to retransmit said reservation request according to a collision resolution algorithm, receiving by said centralized controller said reservation request data on said second path from said particular station, and transmitting on said first path said payload data transmission grant data to said particular station for transmission on said third path of payload data on said payload time-slots allocated by said centralized controller, and optionally detecting by said centralized controller a collision due to simultaneous transmission of said reservation requests by two or more stations on the same reservation time-slot of said second path, and then transmitting said collision statuses of said reservation requests on said first path to said stations, which will retransmit their reservation requests according to said collision resolution algorithm, wherein said second path on which reservation request packets are transmitted is one of a plurality of upstream control channels.

28. A multiple access method via a shared medium of a network, said network comprising a centralized controller and a plurality of stations connected to said centralized controller over a shared medium, wherein a first distinct shared unidirectional transmission path is established between said centralized controller and said stations for broadcasting data from said centralized controller to said stations, at least second and third distinct shared unidirectional transmission paths for transmitting data from said stations to said centralized controller, wherein the first path being a downstream channel and said second and third paths each being an upstream channel, said multiple access method comprising the steps of:

transmitting from a particular station reservation request data on said second path and receiving a payload data transmission grant message from said centralized controller on said first path to transmit payload data packets on said third path from said particular station to said centralized controller on payload time-slots allocated by said centralized controller, transmitting from said particular station said reservation request data on said second path if said particular station fails to receive a grant message from said centralized controller within a predetermined time delay or if said particular station receives a collision status message from said centralized controller on said first path to retransmit said reservation request according to a collision resolution algorithm, receiving by said centralized controller said reservation request data on said second path from said particular station, and transmitting on said first path said payload data transmission grant data to said particular station for transmission on said third path of payload data on said payload time-slots allocated by said centralized controller, and optionally detecting by said centralized controller a collision due to simultaneous transmission of said reservation requests by two or more stations on the same reservation time-slot of said second path, and then transmitting said collision statuses of said reservation requests on said first path to said stations, which will retransmit their reservation requests according to said collision resolution algorithm, wherein said third path on which reservation request packets are transmitted is one of a plurality of upstream payload channels.

29. A circuit located at a station for interfacing said station to a centralized controller in a network comprising:

a data receiver, and first and second data transmitters, wherein said receiver being connected to a first shared unidirectional transmission path between said station and said centralized controller for receiving data transmitted unidirectionally from said centralized controller to said station, wherein said first transmitter being connected to a second shared unidirectional transmission path between said station and said centralized controller for transmitting reservation request data unidirectionally from said station to said centralized controller, wherein said second transmitter being connected to a third shared unidirectional transmission path between said station and said centralized controller for transmitting payload data unidirectionally from said station to said centralized controller, and wherein transmissions over said second and third paths are carried out simultaneously during overlapping time periods in said station.

30. The circuit of claim 29 further comprising a reservation request data transmission circuit corresponding to each said station for transmitting said reservation request data on said second path, and for transmitting payload data on said third path upon receipt of a subsequent payload transmission grant from said centralized controller on said first path.

31. A circuit located at a station for interfacing said station to a centralized controller in a network comprising a data receiver, first and second data transmitters, and wherein said receiver being connected to a first shared unidirectional transmission path between said station and said centralized controller for receiving data transmitted unidirectionally from said centralized controller to said station, wherein said first transmitter being connected to a second shared unidirectional transmission path between said station and said centralized controller for transmitting reservation request data unidirectionally from said station to said centralized controller, wherein said second transmitter being connected to a third shared unidirectional transmission path between said station and said centralized controller for transmitting payload data unidirectionally from said station to said centralized controller, a retransmission decision circuit which includes a collision resolution algorithm for responding to said receiver receiving from said centralized controller on said first path a bitstream containing an indication that a collision has occurred in said second path by causing said first transmitter to re-transmit said reservation request on said second path.

32. A circuit located at a centralized controller for interfacing said centralized controller to a plurality of stations in a network comprising:

a data transmitter, first and second data receivers, and wherein said transmitter being connected to a first shared unidirectional transmission path between said centralized controller and said stations for transmitting unidirectionally from said centralized controller to said stations, wherein said first receiver being connected to a second shared unidirectional transmission path between said centralized controller and said stations for receiving data transmitted unidirectionally only from said stations to said centralized controller, and wherein said second receiver being connected to a third shared unidirectional transmission path between said centralized controller and said stations for receiving data transmitted unidirectionally only from said stations to said centralized controller, a second circuit for detecting whether a collision has occurred in a particular time-slot on said second path due to simultaneous transmissions on said time-slot from two or more stations, and for causing, in response to detecting said collision, said transmitter to transmit on said first path a notification to at least said stations where said collision has occurred.

* * * * *

UNITED STATES PATENT AND TRADEMARK OFFICE
CERTIFICATE OF CORRECTION

PATENT NO.        : 5,963,557                                                   Page 1 of 1
APPLICATION NO.   : 08/843033
DATED             : October 5, 1999
INVENTOR(S)       : John W. Eng It is certified that error appears in the above-identified patent and that said Letters Patent is hereby corrected as shown below:

IN THE DRAWINGS

Figure 10A:
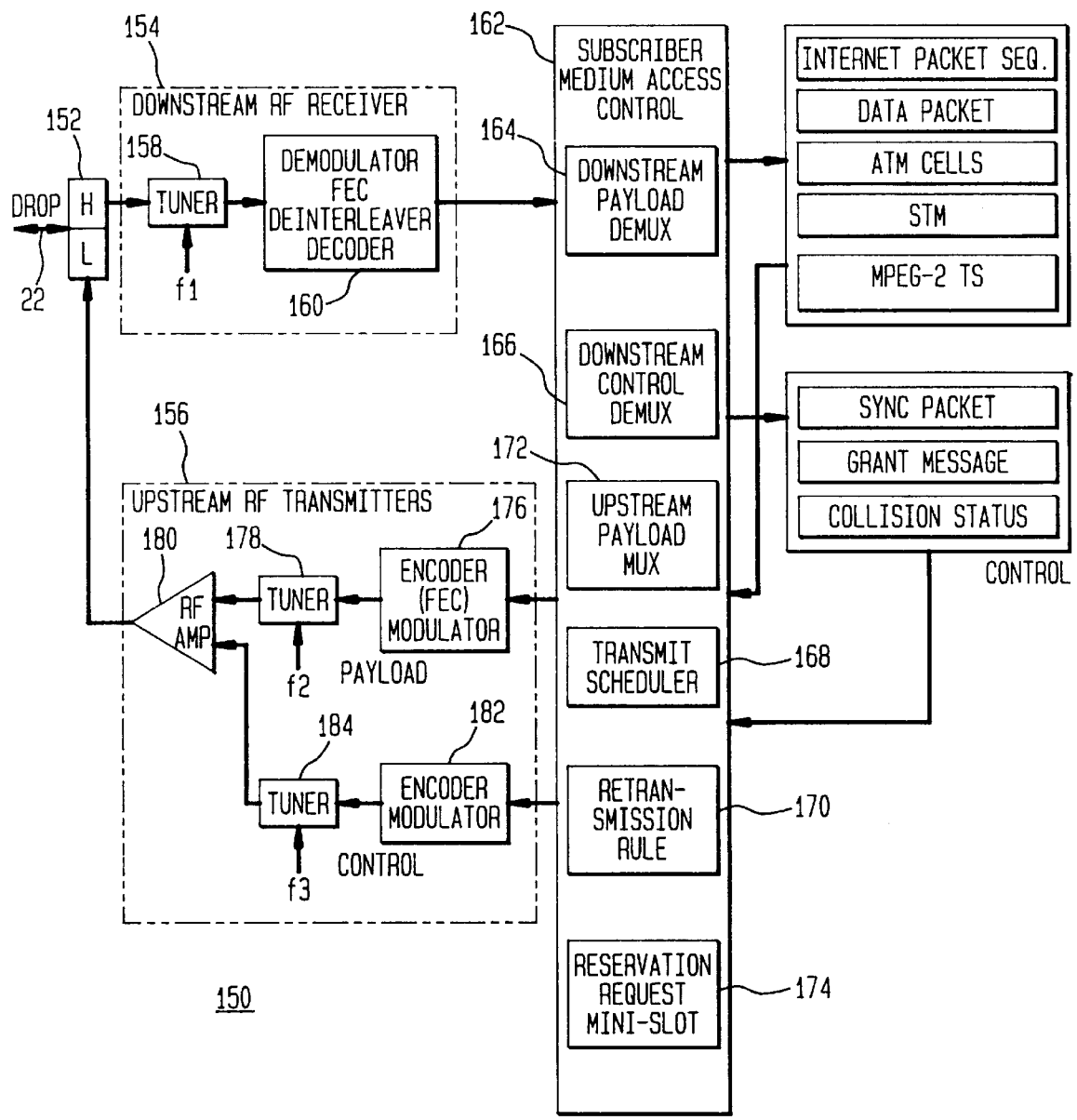
FIG. 10 shows circuitry in a subscriber station according to an embodiment of the present invention.

On Sheet 5 of the drawings, delete "Fig. 10A" and replace it with -- Fig. 10 --.

Figure 10B:
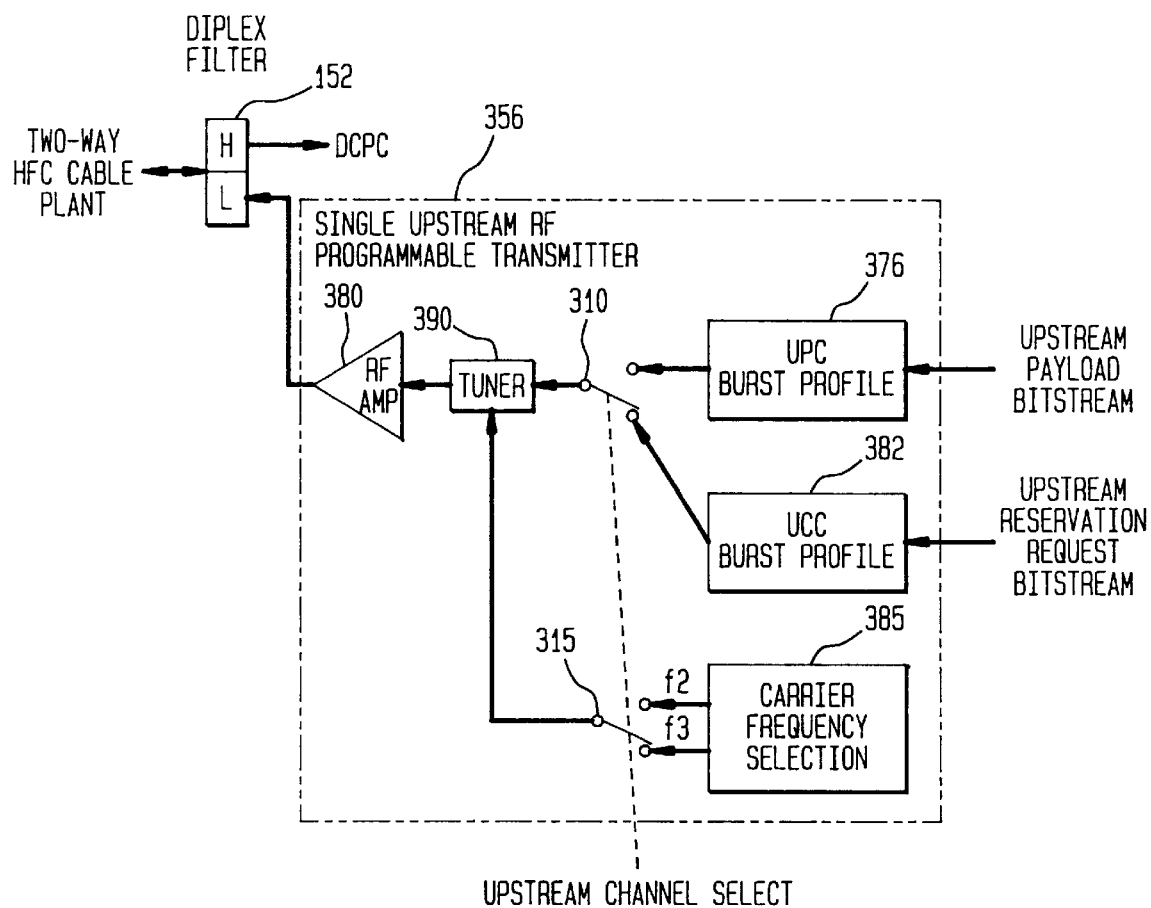

Remove Sheet 6 of the drawings (Fig. 10B).

Signed and Sealed this

Fifteenth Day of June, 2010

David J. Kappos
*Director of the United States Patent and Trademark Office*